United States Patent
Akita et al.

(10) Patent No.: US 6,326,834 B1
(45) Date of Patent: Dec. 4, 2001

(54) PUMP CIRCUIT BOOSTING A SUPPLY VOLTAGE

(75) Inventors: Hironobu Akita; Masaharu Wada, both of Yokohama; Kenji Tsuchida, Kawasaki; Hironori Banba, Niigata, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/602,896

(22) Filed: Jun. 23, 2000

(30) Foreign Application Priority Data

Jun. 30, 1999 (JP) .................................................. 11-185854
Mar. 21, 2000 (JP) .................................................. 12-078419

(51) Int. Cl.$^7$ ...................................................... G05F 1/10
(52) U.S. Cl. ........................ 327/536; 327/537; 327/541; 307/110
(58) Field of Search ................................... 327/536, 537, 327/538, 589, 534, 535, 390, 540, 541, 543, 148, 157; 326/88; 307/110; 363/59, 60

(56) References Cited

U.S. PATENT DOCUMENTS

| | | | |
|---|---|---|---|
| 5,408,140 | * | 4/1995 | Kawai et al. ........................ 327/536 |
| 5,532,640 | * | 7/1996 | Okunaga .............................. 327/537 |
| 5,754,476 | * | 5/1998 | Caser et al. ..................... 365/185.29 |
| 5,831,470 | * | 11/1998 | Park et al. ........................... 327/536 |
| 6,008,690 | * | 12/1999 | Takeshima et al. ................. 327/534 |
| 6,011,743 | * | 1/2000 | Khang .................................. 365/226 |
| 6,023,187 | * | 2/2000 | Camacho et al. .................... 327/536 |

OTHER PUBLICATIONS

1996 Symposium on VLSI Circuits Digest of Technical Papers, "An Efficient Charge Recycle and Transfer Pump Circuit for Low Operating Voltage DRAMs", Takeshi Hamamoto, et al., pp. 110–111.

IEEE Journal of Solid–State Circuits, vol. 32, No. 8, Aug. 1997, "A Dynamic Analysis of the Dickson Charge Pump Circuit", Toru Tanzawa, et al., pp. 1231–1240.

1999 Symposium on VLSI Circuits Digest of Technical Papers, "Charge Sharing Concept for Power Efficiency and EME Improvement of Boosted Charge Pumps in NVMs", Christl Lauterbach, et al.

* cited by examiner

*Primary Examiner*—Kenneth B. Wells
*Assistant Examiner*—Hai L. Nguyen
(74) *Attorney, Agent, or Firm*—Banner & Witcoff, Ltd.

(57) ABSTRACT

First transistors for charging respective one side nodes of a plurality of capacitors are connected to these nodes of the capacitors, respectively. Second transistors for outputting electric charge of each capacitor are connected between respective one side nodes of the capacitors and an output terminal, respectively. A plurality of third transistors for transferring the electric charge of the other side nodes of the capacitors to the other nodes are connected to the respective other nodes. The electric charge of each capacitor is serially transferred from nodes of a high electric potential to nodes of a lower electric potential through one path by sequentially controlling the third transistors, or the electric charge of each capacitor is parallel transferred between arbitrary nodes of a high electric potential and low nodes through a plurality of paths. By these operations, electric charge of each capacitor is recycled.

11 Claims, 15 Drawing Sheets

PUMP CIRCUIT BOOSTING A SUPPLY VOLTAGE

CROSS-REFERENCE TO RELATED APPLICATIONS

This application is based upon and claims the benefit of priority from the prior Japanese Patent Applications No. 11-185854, filed Jun. 30, 1999; and No. 2000-078419, filed Mar. 21, 2000, the entire contents of which are incorporated herein by reference.

BACKGROUND OF THE INVENTION

The present invention relates to an pump circuit which, for example, is applied to a semiconductor integrated circuit, such as a dynamic RAM and a flash EEPROM, and generates a voltage higher than the supply voltage in the semiconductor integrated circuit.

Recently, low power consumption in semiconductor integrated circuits has been required, and according to this demand a supply voltage has been lowered. However, there are circuits that require a voltage higher than a supply voltage in a semiconductor integrated circuit. By this reason a so-called charge pump circuit is provided for boosting the supply voltage to a predetermined voltage in the semiconductor integrated circuit, and the voltage boosted by the pump circuit is supplied to the circuit requiring a high voltage.

FIG. 29 shows an example of a conventional charge pump circuit. This charge pump circuit constituted of an inverter circuit IV to which an input signal Sin is supplied, a capacitor C as a coupling capacitor whose one end is connected to an output terminal of the inverter circuit IV, and N-channel transistors TN1, TN2 connected to the other end of the capacitor C. The inverter circuit IV is composed of a P-channel transistor TP1 and a n N-channel transistor TN3. In this circuit, the voltage of a node ND1 is transmit ted to a node ND2 via the capacitor C so as to boost the voltage of the node ND2.

FIG. 30 is waveforms showing operations of FIG. 29. The transistor TN1 is activated at a time t1, and the node ND2 is precharged to a supply voltage vcc via the transistor TN1. After this, the input voltage Sin is made a low level at a time t2. Accompanied with this, the node ND1 is made the supply voltage Vcc via the inverter circuit IV. Then, the electric potential of the node ND2 is boosted to 2 Vcc via the capacitor C. Next, at a time t3, the transistor TN2 is activated, and the electric potential of the node ND2 is output as a boosted voltage Vpp via the transistor TN2. After this at a time t4 the input voltage Sin is made a high level, and the inverter IV is inverted.

By the charge pump circuit shown in FIG. 29, a required boosted voltage Vpp can be generated. However, this circuit has a problem of a low current efficiency, that is, a high current consumption.

For example, as a method for improving the current efficiency of the charge pump circuit shown in FIG. 29, there is a pump circuit described in "An Efficient Charge Recycle and Transfer Pump Circuit for Low Operation Voltage DRAMs, Takeshi Hamamoto et al., 1996 Symposium on VLSI Circuit Digest of Technical Papers." This circuit is constituted, for example, using a plurality of charge pump circuits as shown in FIG. 29, and the improvement of the current efficiency is attempted by recycling electric charge of the capacitors of the charge pump circuits.

FIG. 31 shows a conventional two phase charge recycle pump circuit constituted using two pump circuits resembling the pump circuit described in the above mentioned literature. (In this two phase charge recycle pump circuit, electric charge is transmitted through one path from a node with a high electric potential to a node with a low electric potential. Thus, this circuit is called two phase serial charge recycle pump circuit.) Attaching numerals 1, 2 are added to the same symbols of the same parts in FIG. 31 as those in FIG. 29. In this circuit, a transistor TN4 is connected to charge coupling nodes ND11, ND12 of capacitors C11, C12 each another. The electric charge of these nodes ND11, ND12 is recycled via the transistor TN4.

FIG. 32 shows waveforms showing operations of the circuit shown in FIG. 31. As shown in FIG. 32, in the circuit shown in FIG. 31, a P-channel transistor TP1 is turned on according to a precharge signal PRE, and the node ND11 is precharged to the supply voltage Vcc. An equalizing signal EQ is activated, and an N-channel transistor TN4 is turned on, whereby the electric potentials of the node ND11 and the node ND12 are made equal. That is, a half of the electric charge of the node ND11 is transferred to the node ND12.

With this, in the circuit shown in FIG. 31, since the electric charge of the nodes ND11, ND12 is recycled by the N-channel transistor TN4 operated according to the equalizing signal EQ, the current efficiency is improved. However, in the case of two phase charge recycle pump circuit, the fluctuations of the voltages of the nodes ND11, ND12 are decreased to 0.5 Vcc. Thus, the maximum voltage of the boosted voltage Vpp that can be output is reduced from 2 Vcc of the conventional to 1.5 Vcc.

FIG. 33 shows a conventional four phase charge recycle pump circuit (four phase serial charge recycle pump circuit) in which capacitors and transistors are further added to the circuit shown in FIG. 31, and FIG. 34 shows waveforms illustrating operations of the circuit shown in FIG. 33. In the case of four phase charge recycle pump circuit, the electric charge of the node ND11 is transferred to other nodes one after another according to the equalizing signal EQ and the precharge signal PRE. Accordingly, since the recycle frequency of the four phase charge recycle pump circuit is higher compared with the two phase charge recycle pump circuit, a utilization efficiency of current is improved so as to enable power-saving. However, in this pump circuit, the maximum voltage of the boosted voltage Vpp is reduced from 2 Vcc of the conventional to 1.25 Vcc.

In the case where the number of steps of a pump circuit is increased so as to obtain an n phase, when a maximum voltage Vpp is in vicinity of a supply voltage vcc, a maximum current efficiency is increased to a level of 1/[1+(1/n)]. However, a maximum boosted voltage is decreased to 1/[1+(1/n)]Vcc. Accordingly, there is a problem that a high voltage can not be output and efficiency is reduced in a high voltage area compared with a conventional pump circuit.

FIG. 35 shows an improved pump circuit of the circuit shown in FIG. 31. This pump circuit is a conventional two phase charge recycle pump circuit in which the electric charges charged in charge coupling nodes of two capacitors are mutually recycled. (In this two phase charge recycle pump circuit, electric charge is transmitted bidirectionally from an arbitrary node with a high electric potential to a node with a low electric potential. Thus, this circuit is called two phase parallel charge recycle pump circuit.) FIG. 36 is waveforms showing operations of FIG. 35.

In this pump circuit, the nodes ND12, ND11 are alternately precharged to a supply voltage Vcc according to precharge signals PRE1, PRE2. Then, the nodes ND11, ND12 are equalized by an N-channel transistor TN4 turned on according to the equalizing signal EQ. According to this equalizing operation the electric charges of the nodes ND11, ND12 are recycled. That is, electric charge is transferred from a node with a high electric potential to a node with a low electric potential by the operation that the nodes ND11, ND12 precharged to the supply voltage Vcc are equalized, whereby the electric charges remaining in each node ND11, ND12 are recycled. Then, current is supplied from a power supply to the node where electric potential is boosted, and the node where electric potential is lowered is grounded. Operations like this are repeated so as to generate a high voltage.

However, in each conventional charge recycle pump circuit described above, electric charge is not fully recycled. For example, in the case of the circuit shown in FIG. 35, the electric charges of the nodes ND11, ND12 are recycled only once. That is, the electric charge transferred in one recycle is the half of the electric charge remaining in each node, and the remaining ½ electric charge is not utilized. By this reason a large amount of current is required in order to obtain a high output voltage, thereby causing difficulty in obtaining a satisfactory current efficiency.

BRIEF SUMMARY OF THE INVENTION

The present invention is to solve the above described problems, and it is an object of the present invention to provide a pump circuit in which a desired high voltage can be obtained by effectively utilizing the electric charge charged in a charge coupling node of a capacitor so as to improve the current efficiency.

An object of the present invention is achieved through a pump circuit comprising: at least three capacitors each having a first node and a second node;

a plurality of first transistors connected between the first nodes of the respective capacitors and a first power supply, the first transistors charging the first nodes, respectively; a plurality of second transistors connected between the second nodes of respective the capacitors and the first power supply, the second transistors charging the second nodes, respectively; a plurality of third transistors connected between the second nodes of respective the capacitors and an output terminal, the third transistors outputting the electric charge of respective the capacitors to the output terminal; and a plurality of fourth transistors connected between the first nodes of respective the capacitors, the forth transistors sharing control signals with the first transistors corresponding thereto.

An object of the present invention is achieved through a pump circuit comprising: at least three capacitors each having a first node and a second node; a plurality of first transistors connected between the first nodes of respective the capacitors and a first power supply, the first transistors charging the first nodes, respectively; a plurality of second transistors connected between the second nodes of respective the capacitors and the first power supply, the second transistors charging the second nodes, respectively; a plurality of third transistors connected between the second nodes of respective the capacitors and an output terminal, the third transistors outputting the electric charge of respective the capacitors to the output terminal; a plurality of fourth transistors each connected between the first node of one of respective the capacitors and the first node of one of the capacitors which is adjacent to the capacitor, each the forth transistor transferring electric charge between the first nodes of respective the capacitors; at least one fifth transistor connected between the first node of one of respective the capacitors and the first node of at least another one of the capacitors which is excluded from the capacitor which is adjacent to the capacitor, the fifth transistor transferring electric charge between the first nodes of respective the capacitors; a detection circuit detecting a boosted voltage output from the output terminal; and a control circuit connected to the detection circuit, the control circuit selectively turning on the fourth transistors so as to serially transfer electric charge between the first nodes of the capacitors adjacent to each other when the voltage detected by the detection circuit is lower than a reference voltage and selectively turning on the first transistors, the fourth transistors, and the fifth transistors so as to parallel transfer electric charge of the first nodes of the capacitors to the first nodes of the capacitors adjacent to each other and the first nodes of the other capacitors when the voltage detected by the detection circuit is higher than the reference voltage.

According to the present invention, electric charge can be effectively utilized by recycling the electric charge of each capacitor. Therefore, the voltage to be supplied to each node from a power supply can be reduced. Thus, electric charge can be effectively utilized in order to obtain a required high voltage, and current consumption can be reduced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Referring to drawings, embodiments according to the present invention will be explained.
(First Embodiment)

Figure 1:
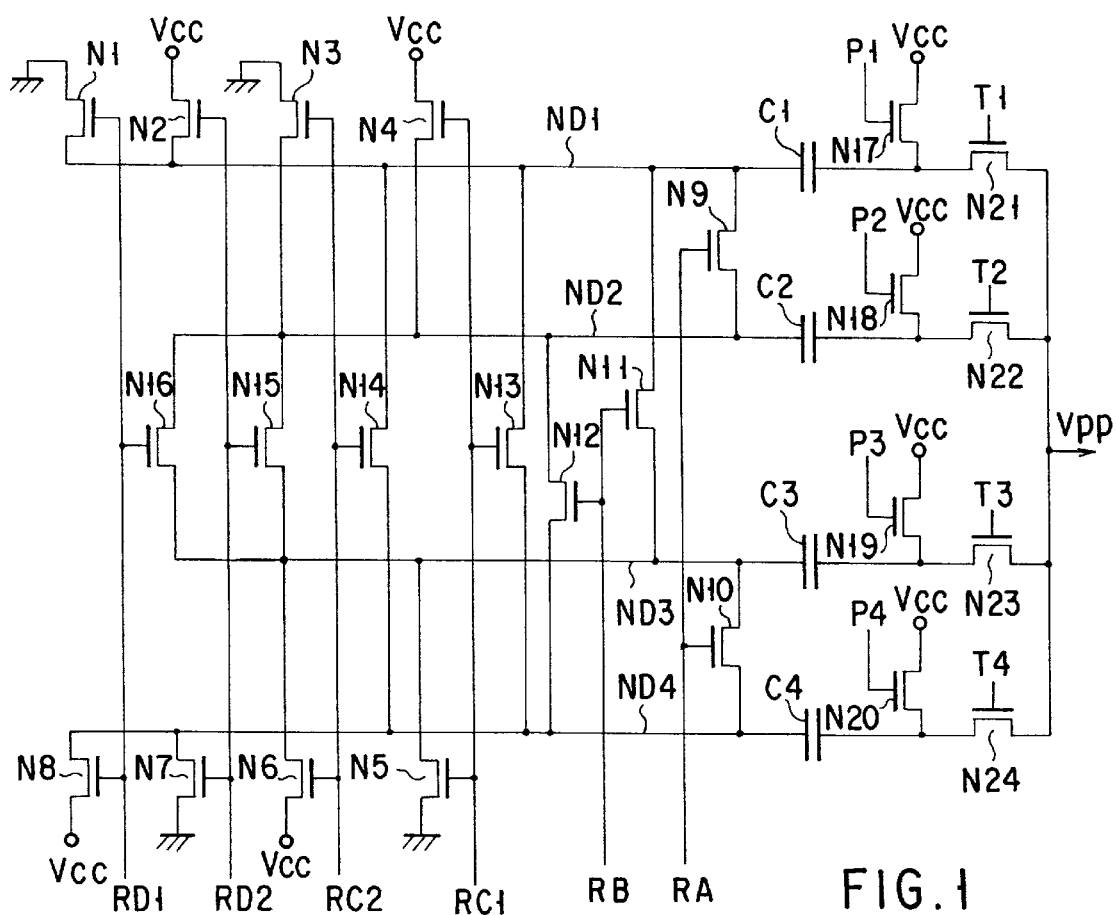
FIG. 1 is a circuit diagram showing a first embodiment according to the present invention.
Figure 2:
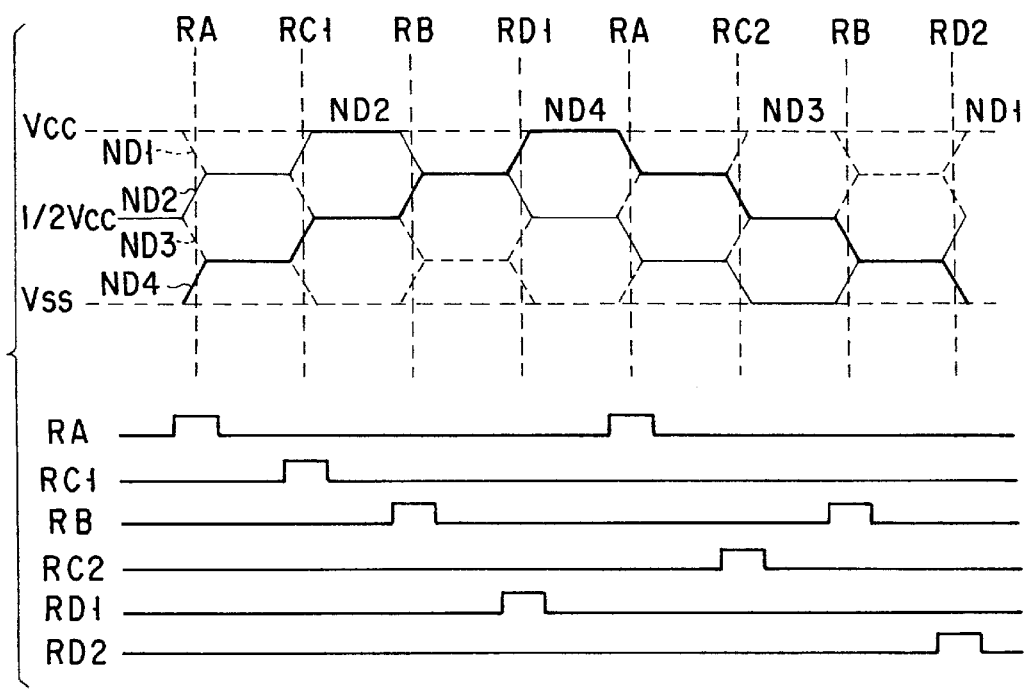
FIG. 2 is waveforms illustrating operations of FIG. 1.

FIG. 1 shows the first embodiment of the present invention and illustrates one example of a four phase parallel charge recycle pump circuit. FIG. 2 is waveforms showing operations of FIG. 1. In the circuit shown in FIG. 1, the electric charge charged in charge coupling nodes (hereafter, simply referred to nodes) in four charge pump circuits is recycled one after another between four nodes, thereby improving the current efficiency and enabling a boost to a higher voltage.

In FIG. 1, an N-channel transistor N1 for discharging electric charge of a node ND1 is connected between the node ND1 and a ground. An N-channel transistor N2 for charging the node ND1 is connected between the node ND1 and a terminal to which a power supply voltage Vcc is supplied. An N-channel transistor N3 for discharging the charge of a node ND2 is connected between the node ND2 and the ground. An N-channel transistor N4 for charging the node ND2 is connected between the node ND2 and the terminal to which the power supply voltage Vcc is supplied. An N-channel transistor N5 for discharging the charge of a node ND3 is connected between the node ND3 and the ground. An N-channel transistor N6 for charging the node ND3 is connected between the node ND3 and the terminal to which the power supply voltage Vcc is supplied. An N-channel transistor N7 for discharging the charge of a node ND4 is connected between the node ND4 and the ground. An N-channel transistor N8 for charging the node ND4 is connected between the node ND4 and the terminal to which the power supply voltage Vcc is supplied.

An N-channel transistor N9 for transferring charge between the nodes ND1, ND2 is connected between the nodes ND1, ND2. An N-channel transistor N10 for transferring charge between the nodes ND3, ND4 is connected between the nodes ND3, ND4. An N-channel transistor N11 for transferring charge between the nodes ND1, ND3 is connected between the nodes ND1, ND3. An N-channel transistor N12 for transferring charge between the nodes ND2, ND4 is connected between the nodes ND2, ND4.

N-channel transistors N13, N14 for transferring charge between the nodes ND1, ND4 are connected between the nodes ND1, ND4. N-channel transistors N15, N16 for transferring charge between the nodes ND2, ND3 are connected between the nodes ND2, ND3.

A signal RA is supplied to the gates of the transistors N9, N10, and a signal RB is supplied to the gates of the transistors N11, N12. A signal RC1 is supplied to the gates of the transistors N4, N5, N13, and a signal RC2 is supplied to the gates of the transistors N3, N6, N14. A signal RD2 is supplied to the gates of the transistors N2, N7, N15, and a signal RD1 is supplied to the gates of the transistors N11, N8, N16.

Giving attention to the node ND1, the charge of the node ND1 is parallel transferable to the nodes ND2, ND3, ND4 via the transistor N9, the transistor N11, and the transistor N13. This operation is similar to that regarding other nodes ND2, ND3, ND4.

One end of each capacitor C1, C2, C3, C4 is connected to the nodes ND1, ND2, ND3, ND4, respectively. N-channel transistors N17, N18, N19, N20 are connected between the other end of the capacitors C1, C2, C3, C4 and the terminal to which the power supply voltage Vcc is supplied, respectively. Signals P1, P2, P3, P4 are supplied to the gates of the transistors N17, N18, N19, N20, respectively.

N-channel transistors N21, N22, N23, N24 are connected between the other end of the capacitors C1, C2, C3, C4 and an output terminal to which a boosted voltage Vpp is output, respectively. Signals T1, T2, T3, T4 are supplied to the gates of the transistors N21, N22, N23, N24, respectively.

In the constitution described above, as shown in FIG. 2, in the case where the node ND1 is the supply voltage Vcc, the nodes ND2, ND3 are ½ vcc, and the node ND4 is a ground voltage Vss, when the signal RA, RC1, RB, RD1, RA, RC2, RB, RD2 in this order become a high level, the electric charge of each node ND1 to ND4 is transferred to another node one by one.

For example, giving attention to the node ND1, when the signal RA goes to a high level, the transistors N9, N10 are turned on, and nodes ND1, ND2 are short-circuited. with this the electric charge of the node ND1 corresponding only to ¼ Vcc is transferred to the node ND2. Then, when the signal RC1 goes to a high level, the transistor N13 is turned on. Thus, the nodes ND1, ND4 are short-circuited, and the charge of the node ND1 corresponding only to ¼ Vcc is transferred to the node ND4. When the signal RB goes to a high level, the transistor N11 is turned on, and the charge of the node ND1 corresponding only to ¼ Vcc is transferred to the node ND3. When the signal RD1 goes to a high level, the transistor N11 is turned on, and the node ND1 is grounded.

After this, when the signal RA goes to a high level, the transistor N9 is turned on. with this the nodes ND1, ND2 are short-circuited, and the charge of the node ND2 corresponding only to ¼ Vcc is transferred to the node ND1. Then, when the signal RC2 goes to a high level, the transistor N14 is turned on. With this the nodes ND1, ND4 are short-circuited, and the charge of the node ND4 corresponding only to ¼ Vcc is transferred to the node ND1. Further, when the signal RB goes to a high level, the transistor N11 is turned on. With this the nodes ND1, ND3 are short-circuited, and the charge of the node ND3 corresponding only to ¼ Vcc is transferred to the node ND1. Finally, when the signal RD2 goes to a high level, the transistor N2 is turned on, and charge corresponding only to ¼ Vcc is supplied from the power supply to the node ND1. The electric potential of the node ND1 fully swings between the supply voltage Vcc and the ground voltage Vss. With a similar operation, each electric potential of the nodes ND2, ND3, ND4 fully swings between the supply voltage Vcc and the ground voltage Vss.

The signals P1 to P4 go to a high level when the nodes ND1 to ND4 are at least the ground voltage Vss, respectively. With this, the other end of each capacitor C1, C2, C3, C4 is charged to the supply voltage Vcc via the transistors N17, N18, N19, N20, respectively. The signals T1 to T4 go to a high level when the nodes ND1 to ND4 are at least the supply voltage Vcc, respectively. With this, the voltage boosted by coupling at the other end of each capacitors C1, C2, C3, C4 is output via the transistors N21, N22, N23, N24. Therefore, the boosted voltage Vpp output from the output terminal becomes 2 Vcc at its maximum.

According to the first embodiment described above, provided are a plurality of transistors N2, N4, N6, N8 selectively supplying the power supply voltage Vcc to each node ND1 to ND4, a plurality of transistors N11, N3, N5, N7 selectively grounding each node ND1 to ND4, and a plurality of transistors N9 to N16 selectively connecting between node ND1 to ND4, and these transistors are turned on one by one so that the electric charge of each node ND1 to ND4 corresponding to ¼ vcc is transferred to other nodes so as to perform recycle. That is, in the case of the first embodiment, each electric potential of the nodes ND1 to ND4 fully swings between the supply voltage Vcc and the ground voltage Vss. Further, since the amount of the current corresponding to the electric potential of only ¼ Vcc is needed to be supplied from the power supply to each node, ¾ of the electric charge charged in each node can be utilized. Therefore, a utilization efficiency of electric charge and a current efficiency for obtaining a required boosted voltage can be improved.

In the case of the first embodiment, since one node goes from the supply voltage Vcc to the ground voltage Vss and returns to the supply voltage Vcc again, eight steps of operations are necessary. However, as shown in FIG. 2, two operations in which the signal RA goes to a high level is similar to each other, and two operations in which the signal RB goes to a high level is similar to each other. Therefore, since only six kinds of control signals are needed, control can be simplified.

Usually, the characteristics in the time when a node is charged from the ground voltage Vss to the supply voltage Vcc and the time when a node is discharged from the supply voltage Vcc to the ground voltage Vss are represented as exponential curves. With this although electric potential is quickly changed in the early charging (discharging) period, fluctuation amount is reduced halfway. However, in the present embodiment, an electric potential range is divided so that each divided one is ¼ at the time of charging from the ground voltage Vss to the supply voltage Vcc and discharging from the supply voltage Vcc to the ground voltage Vss. Therefore, a part generating a large voltage change can always be used, thereby enabling a high speed operation. That is, in the case of the present embodiment, although eight steps are needed in one cycle as described above, since the operation of each step can be performed at high speeded, an increase in the entire operating time can be restricted.

Figure 3:
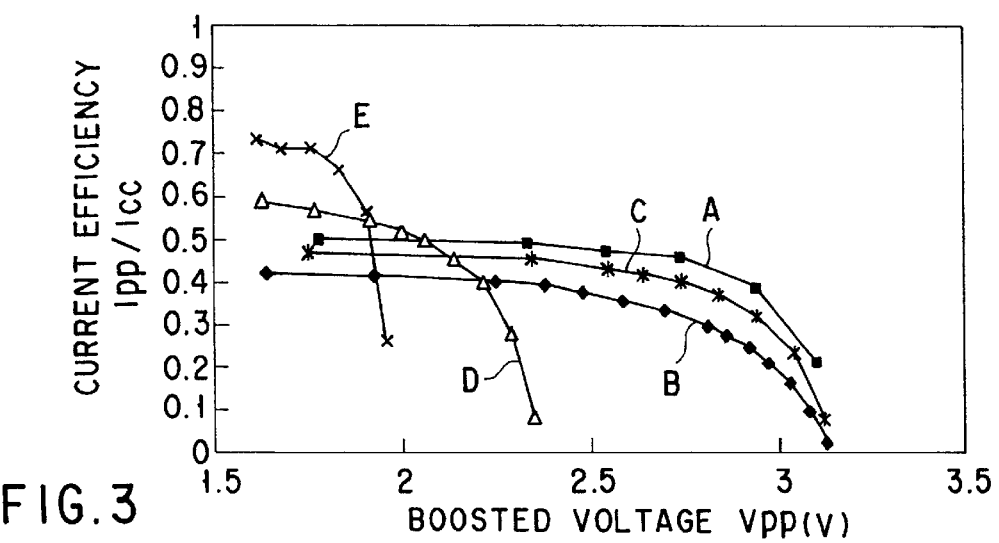
FIG. 3 is a graph illustrating current efficiencies of the present invention and conventional pump circuits.
Figure 4:
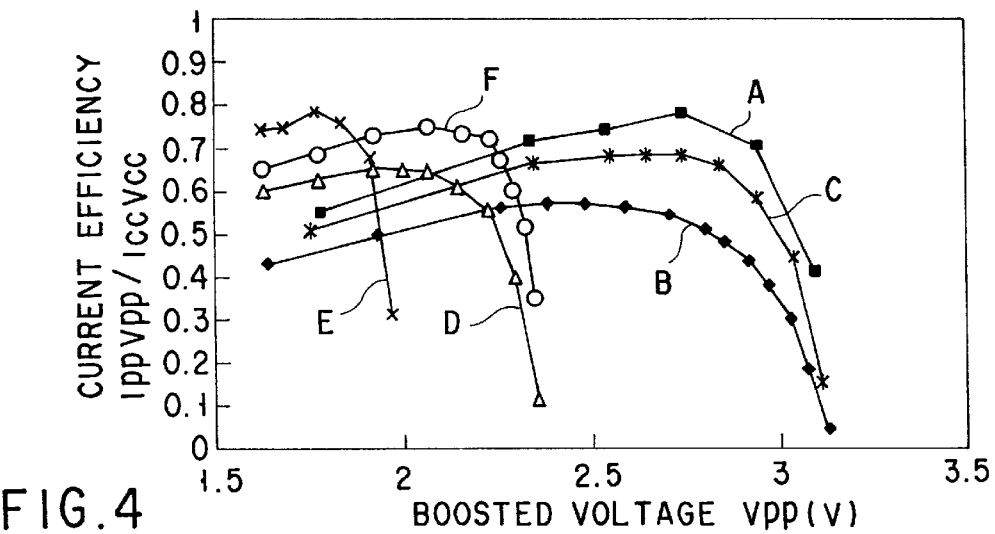
FIG. 4 is a graph illustrating power efficiencies of the present invention and conventional pump circuits.
Figure 29:
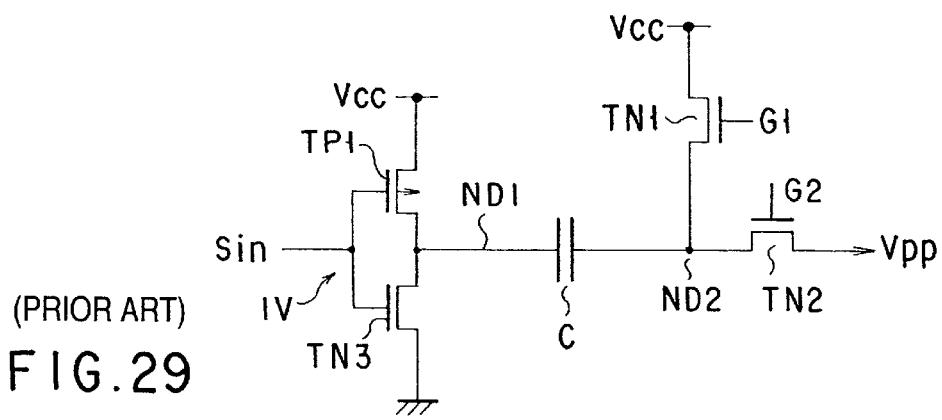
FIG. 29 is a circuit diagram showing one example of a conventional charge pump circuit.
Figure 31:
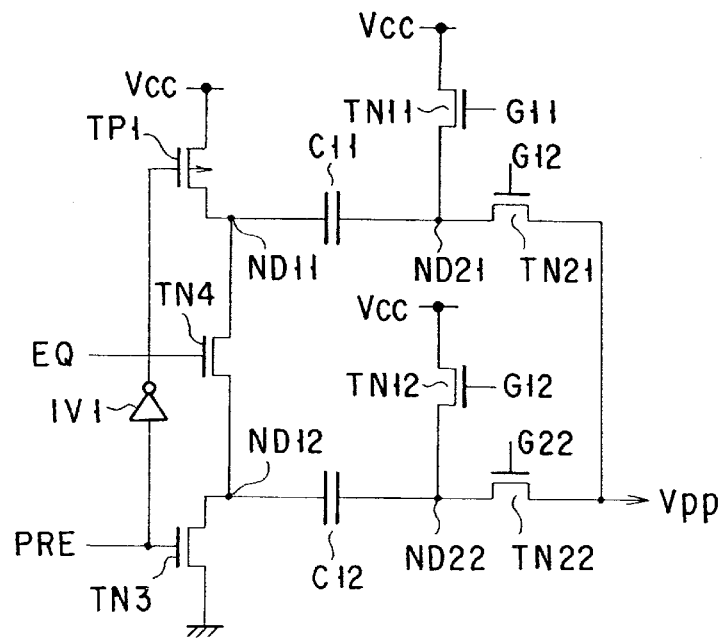
FIG. 31 is a circuit diagram showing a conventional two phase charge recycle pump circuit.
Figure 32:
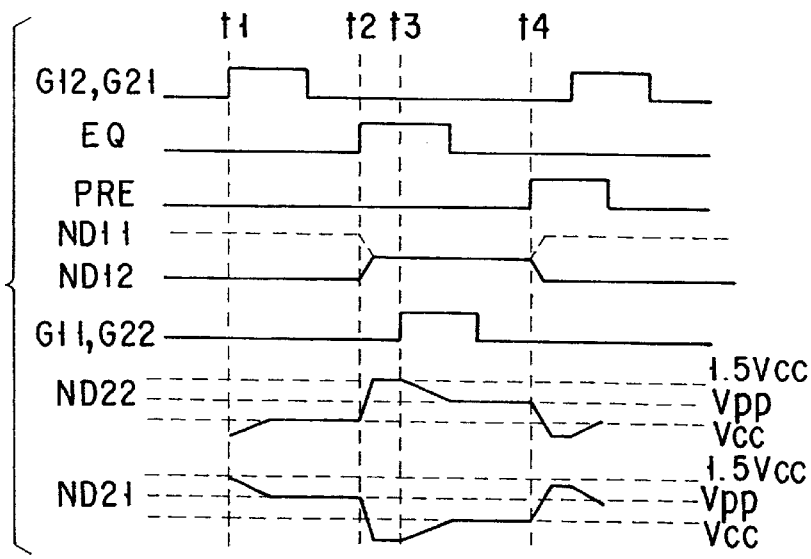
FIG. 32 is waveforms illustrating operations of the circuit shown in FIG. 31.
Figure 33:
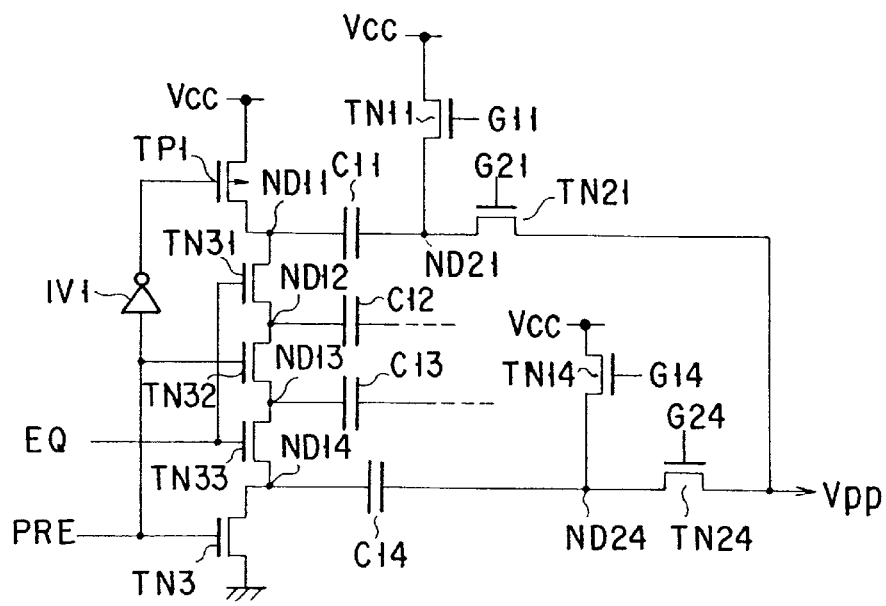
FIG. 33 is a circuit diagram illustrating a conventional four phase charge recycle pump circuit.
Figure 34:
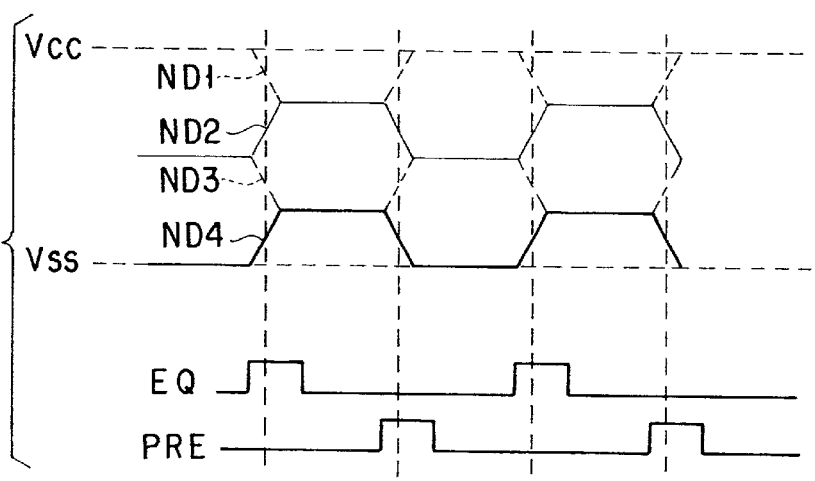
FIG. 34 is waveforms illustrating operations of the circuit shown in FIG. 33.
Figure 35:
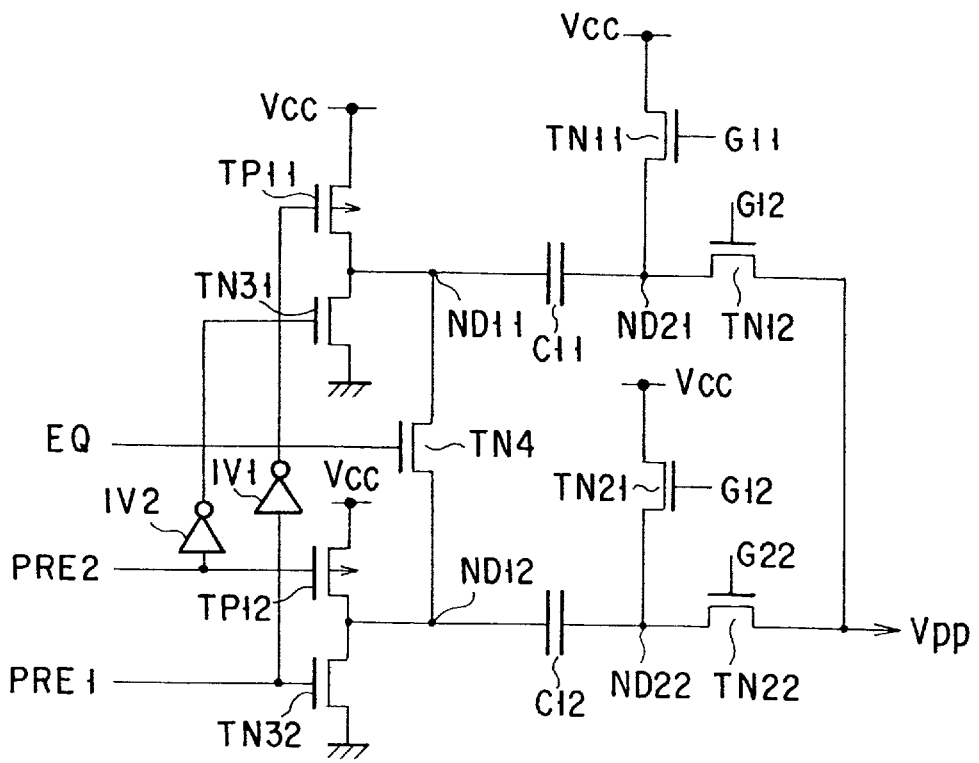
FIG. 35 is a circuit diagram illustrating a conventional two phase parallel charge recycle pump circuit.
Figure 36:
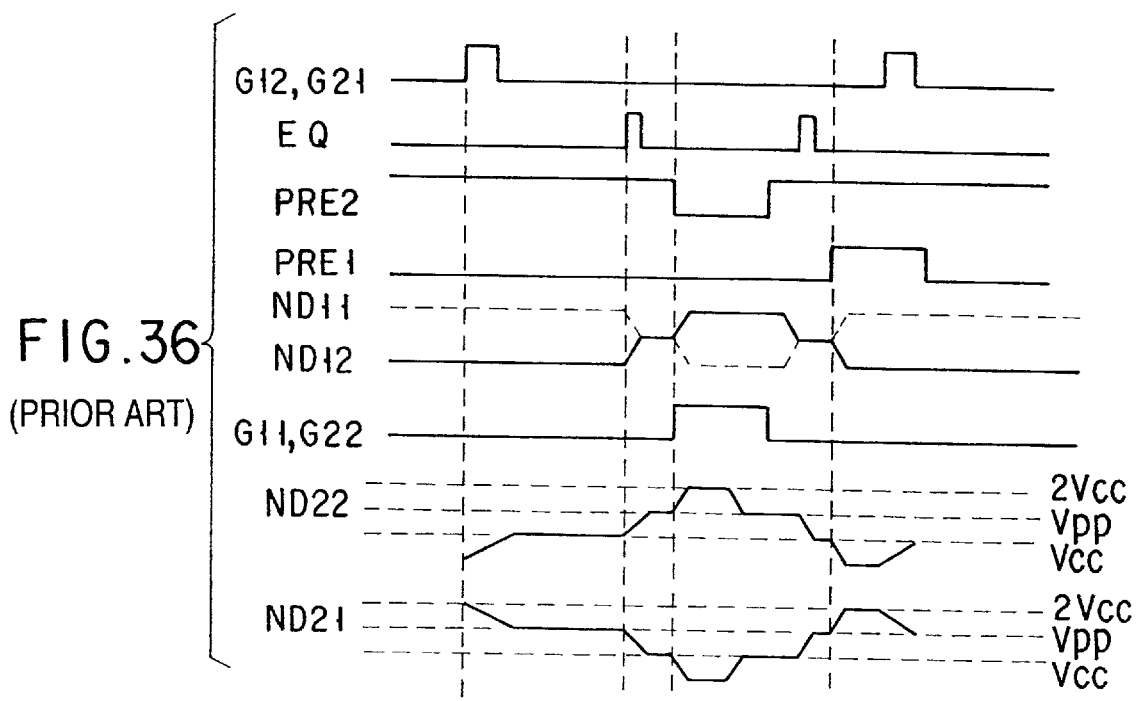
FIG. 36 is waveforms showing operations of FIG. 35.

FIG. 3 illustrates current efficiencies of the time when the supply voltage is 1.6 volts with respect to the four phase parallel charge recycle pump circuit A of the present invention, the conventional normal pump circuit B (shown in FIG. 29), the conventional two phase parallel charge recycle pump circuit C (shown in FIG. 35), the conventional two phase serial charge recycle pump circuit D (shown in FIG. 31), and the conventional four phase serial charge recycle pump circuit E (shown in FIG. 33), and FIG. 4 illustrates power efficiencies thereof.

It can be noticed that the current efficiency of the four phase parallel charge recycle pump circuit A of the present invention is improved when a boosted voltage similar to that of the conventional normal pump circuit B or the two phase parallel charge recycle pump circuit C is obtained.

It may seem that the current efficiency of the four phase parallel charge recycle pump circuit A of the present invention is lower compared with that of the conventional two phase serial charge recycle pump circuit D or the four phase serial charge recycle pump circuit E. However, this is because the boosted voltage is high. When the four phase parallel charge recycle pump circuit A of the present invention is compared with the conventional two phase serial charge recycle pump circuit D and the four phase serial charge recycle pump circuit E in the domain of power efficiency as shown in FIG. 4, it can be understood that the four phase parallel charge recycle pump circuit A of the present invention is outstanding.

Although the four phase parallel charge recycle pump circuit is explained in the first embodiment, constitutions of three phase or four or more phase can also be achieved by employing the principle in question. When a constitution of four or more phase is achieved, recycle efficiency of electric charge of each node can be further improved, and the electric charge amount that is not utilized can be further reduced. Thus, the current efficiency and the power efficiency can be improved.

(Second Embodiment)

Next, the second embodiment of the present invention will be explained. In the second embodiment, the case where one pump circuit is used switching between a parallel charge recycle pump circuit and a serial charge recycle pump circuit will be explained.

As shown in FIG. 4, in a region in which the boosted voltage Vpp is low, the power efficiencies of the serial charge recycle pump circuits are higher than those of the parallel charge recycle pump circuits. It can be noticed that in a region in which the boosted voltage Vpp is high, the power efficiencies of the parallel charge recycle pump circuits are higher than those of the serial charge recycle pump circuits. Therefore, a power efficiency can be improved by using a serial charge recycle pump circuit when a boosted voltage Vpp is low, for example, as a time immediately after a large amount of current is flowed out from an output terminal of a pump circuit and by using a parallel charge recycle pump circuit after the boosted voltage Vpp increases to some degree. However, in the case where both serial charge recycle pump circuit and parallel charge recycle circuit are used, the chip size will be increased, thereby increasing the cost.

In the second embodiment, the four phase parallel charge recycle pump circuit shown in FIG. 1 is made usable as a four serial charge recycle pump circuit. That is, the four phase parallel charge recycle pump circuit shown in FIG. 1 includes all circuit parts as a four phase serial charge recycle pump circuit. Thus, the four phase parallel charge recycle pump circuit can be operated as a serial charge recycle pump circuit.

Figure 5:
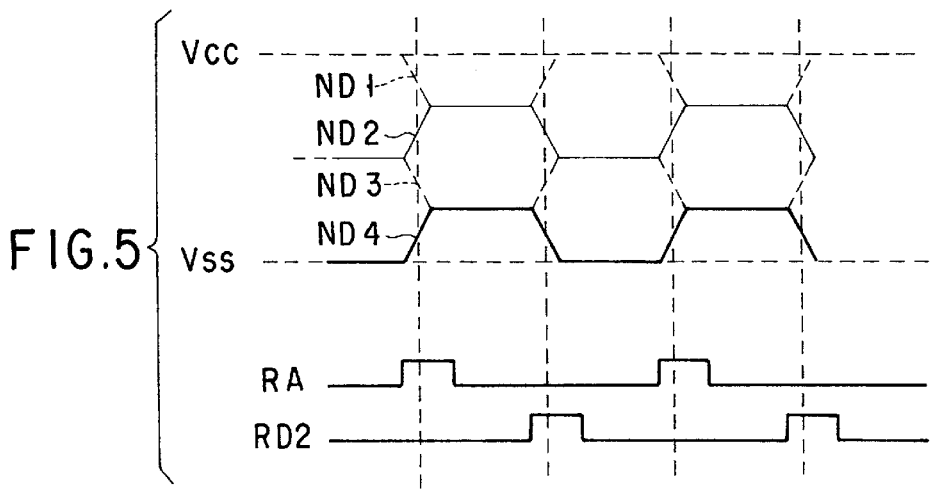
FIG. 5 shows a second embodiment of the present invention and is waveforms illustrating the case where the circuit shown in FIG. 1 is operated as a four phase serial charge recycle pump circuit.

FIG. 5 depicts waveforms of the case where the circuit shown in FIG. 1 is operated as a four phase serial charge recycle pump circuit. In this case, the signals RB, RC1, RC2, RD1 shown in FIG. 1 are maintained at a low level, and only the signals RA, RD2 are changed as shown in FIG. 5. That is, according to the signals RA, RD2 going to a high level, electric charge is transferred between the nodes ND1, ND2 adjacent to each other, between the nodes ND3, ND4, and between the nodes ND2, ND3. By this, the circuit shown in FIG. 1 is operated similarly to the four phase serial charge recycle pump circuit shown in FIG. 33. That is, the electric potential of the node ND1 is repeatedly changed between the supply voltage Vcc and ¾ Vcc, and the electric potential of the node ND2 is repeatedly changed between ½ Vcc and ¾ Vcc. The electric potential of the node ND3 is repeatedly changed between ½ Vcc and ¼ vcc, and the electric potential of the node ND4 is repeatedly changed between the ground voltage Vss and ¼ Vcc.

Figure 6:
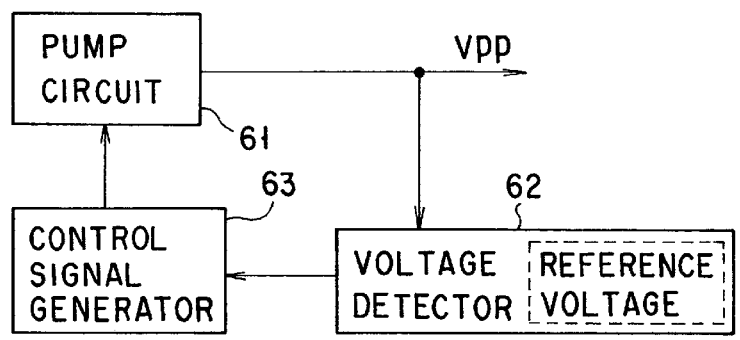
FIG. 6 shows the second embodiment of the present invention and is a block diagram illustrating a switching circuit switching the circuit shown in FIG. 1 to a four phase parallel charge recycle pump circuit and a four phase serial charge recycle pump circuit.

FIG. 6 shows a constitution of a switching circuit switching the circuit shown in FIG. 1 between the four phase parallel charge recycle pump circuit and the four phase serial charge recycle pump circuit.

In FIG. 6, a pump circuit 61 corresponds to the four phase parallel charge recycle pump circuit shown in FIG. 1. The boosted voltage Vpp output from the pump circuit 61 is detected by means of a voltage detector 62. This voltage detector 62 has, for example, a reference voltage, outputs, for example, a low level signal when the boosted voltage vpp is lower than the reference voltage and outputs, for example, a high level signal when the boosted voltage Vpp is higher than the reference voltage. The output signal of the voltage detector 62 is supplied to a control signal generator 63.

The control signal generator 63 generates a signal for operating the pump circuit 61 as a four phase serial charge recycle pump circuit when the low level signal is supplied from the voltage detector 62. That is, the control signal generator 63 maintains the signals RB, RC1, RC2, RD1 at a low level, and only the signals RA, RD2 are changed as shown in FIG. 5. Further, the control signal generator 63 generates a signal for operating the pump circuit 61 as a four phase parallel charge recycle pump circuit when the high level signal is supplied from the voltage detector 62. That is, the control signal generator 63 generates the signals RA, RB, RC1, RC2, RD1, RD2 shown in FIG. 2.

By the second embodiment described above, the four phase parallel charge recycle pump circuit is switched to be operated to the four phase serial charge recycle pump circuit when the boosted voltage Vpp of the four phase parallel charge recycle pump circuit is low, and is operated as the four phase parallel charge recycle pump circuit when the boosted voltage Vpp is increased to some degree. Thus, the power efficiency can be improved in a wide range from a high boosted voltage range to a low boosted voltage range by means of one four phase parallel charge recycle pump circuit.

Further, since one four phase parallel charge recycle pump circuit is operated as a four phase serial charge recycle pump circuit as well, there is a merit in which an increase in a chip area can be prevented compared with the case where two pump circuits are provided.

(Third Embodiment)

Next, the third embodiment of the present invention will be explained. In this embodiment, the case where the four phase parallel charge recycle pump circuit shown in FIG. 1 is further operated as two phase, four phase serial charge recycle pump circuits will be explained. In the second embodiment, the case where the four phase parallel charge recycle pump circuit is operated as a four phase serial charge recycle pump circuit is explained. The four phase parallel charge recycle pump circuit can also be operated as a two phase serial charge recycle pump circuit.

As shown in FIG. 4, a higher boosted voltage can be obtained in the two phase serial charge recycle pump circuit than in the four phase serial charge recycle pump circuit. In the region of the higher boosted voltage, there is a region in which the power efficiency is higher than that of the four phase parallel charge recycle pump circuit. By this, a current efficiency and a power efficiency can be improved in a wide boosted voltage region by switching a four phase serial charge recycle pump circuit, a two phase serial charge recycle pump circuit, and a four phase parallel charge recycle pump circuit relative to the boosted voltage Vpp.

Figure 7A:
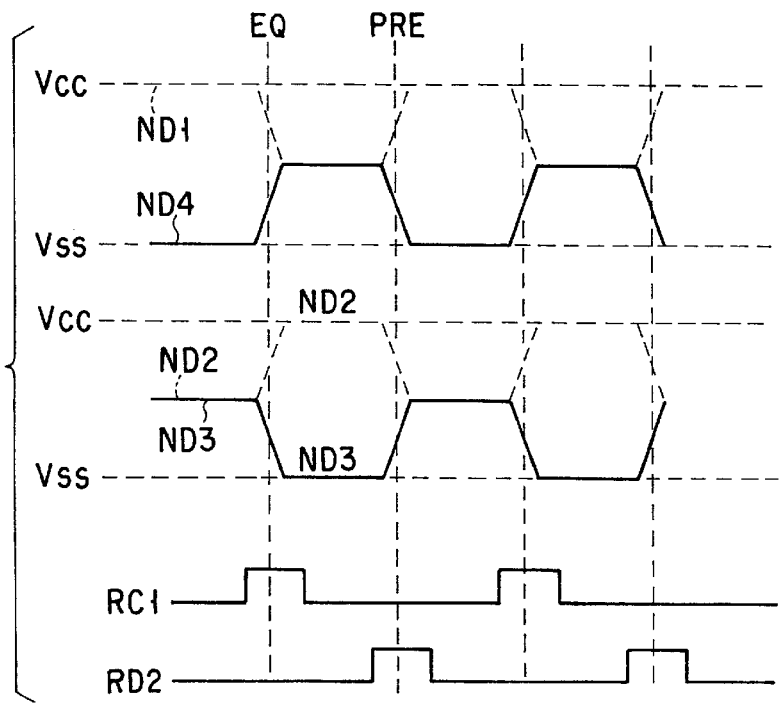
FIG. 7A shows a third embodiment of the present invention and is waveforms illustrating the case where the four phase parallel charge recycle pump circuit shown in FIG. 1 is operated as a two phase serial charge recycle pump circuit.

FIG. 7A shows waveforms of the case where the four phase parallel charge recycle pump circuit shown in FIG. 1 is operated as a two phase serial charge recycle pump circuit. In this case, the signals RA, RB, RC2, RD1 are maintained at a low level, and only the signals RC1, RD2 are changed as shown in FIG. 7A. That is, the transistors N4, N5, N13 are turned on in accordance with the signal RC1, and the electric charge of the node ND1 is transferred to the node ND4 via the transistor N13. The transistors N2, N7, N15 are turned on in accordance with the signal RD2, and the electric charge of the node ND2 is transferred to the node ND3 via the transistor N15. Electric charge is serially recycled between the nodes ND1, ND4 and between the nodes ND2, ND3 in accordance with the signals RC1, RD2.

Figure 7B:
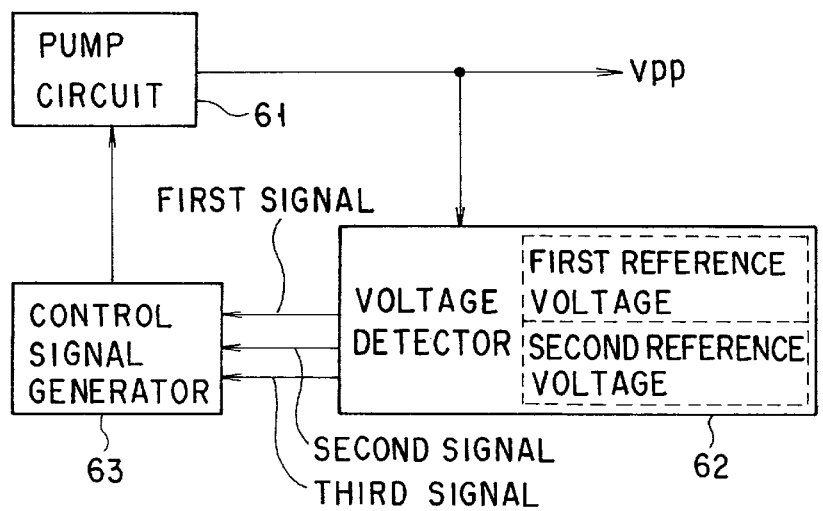
FIG. 7B is a transformed block diagram of FIG. 6.

Switching the four phase serial charge recycle pump circuit, the two phase serial charge recycle pump circuit, and the four phase parallel charge recycle pump circuit can be implemented by transforming the circuit shown in FIG. 6 to the circuit shown in FIG. 7B. That is, in FIG. 7B, the pump circuit 61 corresponds to the four phase parallel charge recycle pump circuit shown in FIG. 1. The boosted voltage Vpp output from the pump circuit 61 is detected by means of the voltage detector 62. This voltage detector 62 has, for example, a first reference voltage and a second reference voltage which is slightly higher than the first reference voltage. The voltage detector 62 outputs a first signal when the boosted voltage Vpp is lower than the first reference voltage and outputs a second signal when the boosted voltage Vpp is higher than the first reference voltage and lower than the second reference voltage. The voltage detector 62 outputs a third signal when the boosted voltage Vpp is higher than the second reference voltage. The first, the second, and the third signals output from the voltage detector 62 are supplied to the control signal generator 63.

When the first signal is supplied from the voltage detector 62, the control signal generator 63 generates a signal for operating the pump circuit 61 as a four phase serial charge recycle pump circuit. That is, the control signal generator 63 maintains the signals RB, RC1, RC2, RD1 at a low level, and only the signals RA, RD2 are changed as shown in FIG. 5.

When the second signal is supplied from the voltage detector 62, the control signal generator 63 generates a signal for operating the pump circuit 61 as a two phase serial charge recycle pump circuit. That is, the control signal generator 63 maintains the signals RA, RB, RC2, RD1 at a low level and changes only the signals RC1, RD2 as shown in FIG. 7A.

Further, when the third signal is supplied from the voltage detector 62, the control signal generator 63 generates a signal for operating the pump circuit 61 as a four phase parallel charge recycle pump circuit. That is, the control signal generator 63 generates the signals RA, RB, RC1,RC2, RD1, RD2 shown in FIG. 2.

By the third embodiment described above, the four phase parallel charge recycle pump circuit is switched to be operated to the four phase serial charge recycle pump circuit, the two phase serial charge recycle pump circuit, or the four phase parallel charge recycle pump circuit in accordance with the level of the boosted voltage Vpp. Accordingly, since one four phase parallel charge recycle pump circuit can be controlled in detail in accordance with the boosted voltage, a current efficiency and a power efficiency can further be improved in a wide boosted voltage range from a high range to a low range.

(Fourth Embodiment)

Next, the fourth embodiment of the present invention will be explained. In the second and third embodiments described above, improvements in a current efficiency and a power efficiency are attempted by controlling the operation of the four phase parallel charge recycle pump circuit in accordance with the level of the boosted voltage Vpp. On the other hand, the fourth embodiment is to satisfy a requirement in which a power efficiency does not necessarily have to be so high and fast boosting is needed. For example, there is the case where the boosted voltage Vpp is not employed and the output terminal of the boosted voltage Vpp is needed to be charged at high speed as at the time of power-on.

Figure 8:
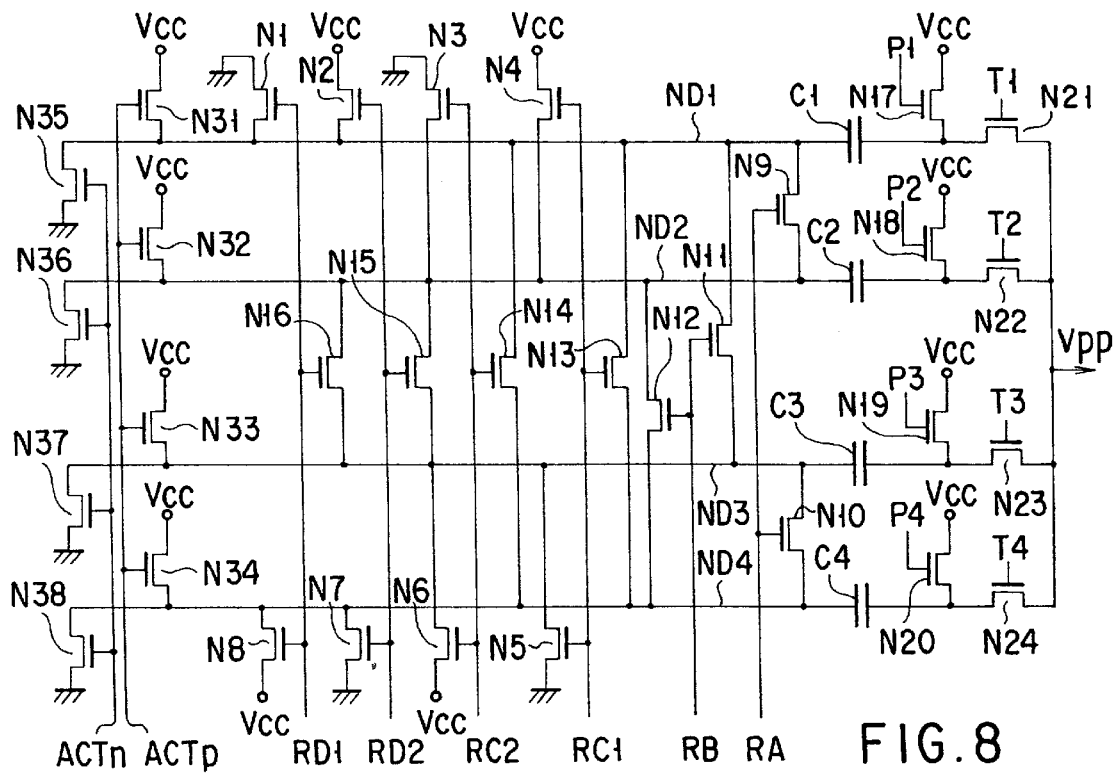
FIG. 8 is a circuit diagram showing a fourth embodiment of the present invention.

FIG. 8 shows the circuit of the fourth embodiment, the same reference numerals are attached to the same parts as those in FIG. 1, and the only different parts will be explained. In this embodiment, N-channel transistors N31 to N38 are newly added to the circuit shown in FIG. 1. The transistors N31, N32, N33, N34 are connected between terminals to which the power supply voltage Vcc is supplied and the nodes ND1, ND2, ND3, ND4, respectively. A signal ACTP is supplied to the gates of the transistors N31, N32, N33, N34.

The transistors N35, N36, N37, N38 are connected between the nodes ND1, ND2, ND3, ND4 and the ground, respectively. A signal ACTn is supplied to the gates of the transistors N35, N36, N37, N38.

Figure 9:
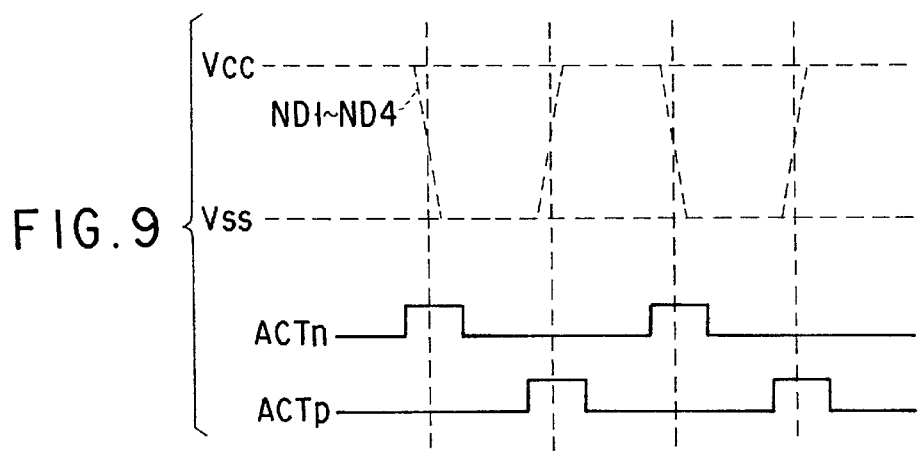
FIG. 9 is waveforms illustrating operations of the time of activating the power supply of the circuit shown in FIG. 8.

FIG. 9 shows operations upon power-on of the circuit shown in FIG. 8. When the power supply is turned on, all the signals RA, RB, RC1, RC2, RD1, RD2 go to a low level, and the signals ACTn, ACTp are controlled as shown in FIG. 9. That is, the signal ACTn and the signal ACTp alternately go to a high level so that the nodes ND1 to ND4 go to the supply voltage Vcc or the ground voltage Vss at the same time. The signals P1 to P4 to be supplied to the gates of the transistors N17 to N20 go to a high level when the nodes ND1 to ND4 are at a low level. The signals T1 to T4 to be supplied to the gates of the transistors N21 to N24 go to a high level when the nodes ND1 to ND4 are at a high level.

The signals P1 to P4 and the signals T1 to T4 go to a high level one after another in accordance with the change of the level of the nodes ND1 to ND4 shown in FIG. 9. That is, the electric charge of each node ND1 to ND4 is not recycled, and the circuit shown in FIG. 8 is operated as merely four charge pump circuits. (Each charge pump circuit is operated similarly to the conventional pump circuit shown in FIG. 10.) With this, the output terminal is boosted at high speed, and the boosted voltage Vpp is obtained.

After this, the signals ACTn, ACTp are maintained at a low level, and the signals RA, RB, RC1, RC2, RD1, RD2 are suitably controlled so that the operations as shown in the first, the second, and the third embodiments are implemented.

In the fourth embodiment, the four phase parallel charge recycle pump circuit is operated as merely four charge pump circuits at the time of power-on. Accordingly, the output terminal can be boosted at high speed by a simple constitution and control. Further, there is an advantage that after boosting, the operations shown in the first, the second, and the third embodiments described above can be implemented.

(Fifth Embodiment)

Next, the fifth embodiment of the present invention will be explained. In a semiconductor integrated circuit, there is the case where a Vbb pump circuit generating a substrate voltage Vbb (e.g., −0.5 volts) is provided.

Figure 10:
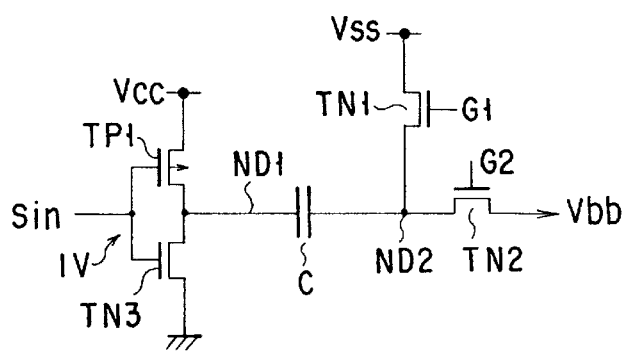
FIG. 10 shows a fifth embodiment of the present invention and is a circuit diagram illustrating one example of a pump circuit generating a substrate voltage.
Figure 11:
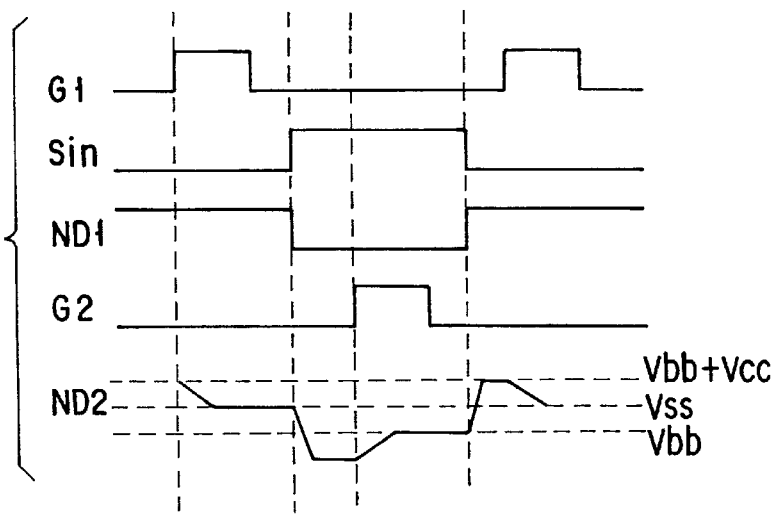
FIG. 11 is waveforms illustrating operations of FIG. 10.
Figure 30:
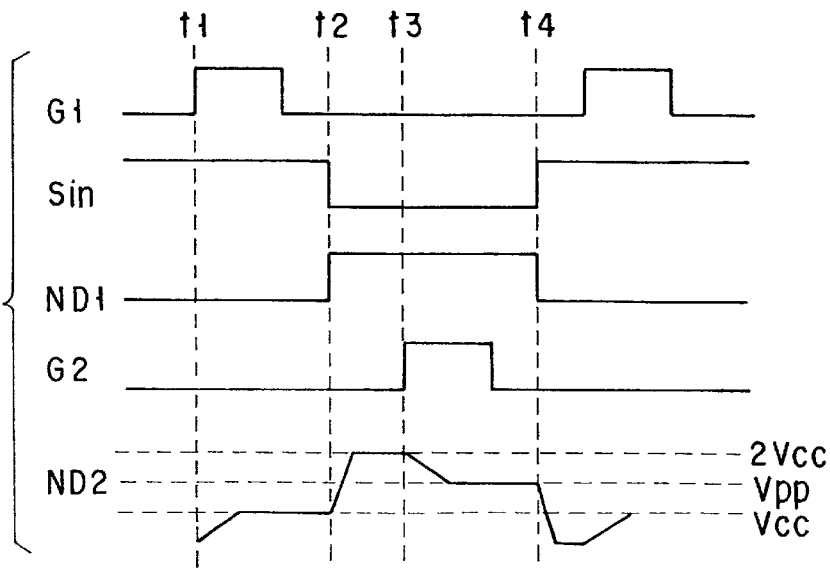
FIG. 30 is waveforms illustrating operations of the circuit shown in FIG. 29.

FIG. 10 shows an example of the Vbb pump circuit, and the FIG. 11 is waveforms illustrating the operations of FIG. 10. The basic constitution of the Vbb pump circuit is similar to the charge pump circuit shown in FIG. 29, and the difference thereof is that the power supply to be supplied to the transistor TN1 is the ground voltage Vss. The timing of signals G1, G2 relative to the electric potential of the node ND1 shown in FIG. 11 differs from that of FIG. 30. By this constitution and operation timing, electric charge can be drawn from the output terminal to the node of the ground electric potential Vss, and the substrate voltage Vbb as a negative voltage can be produced.

Figure 12:
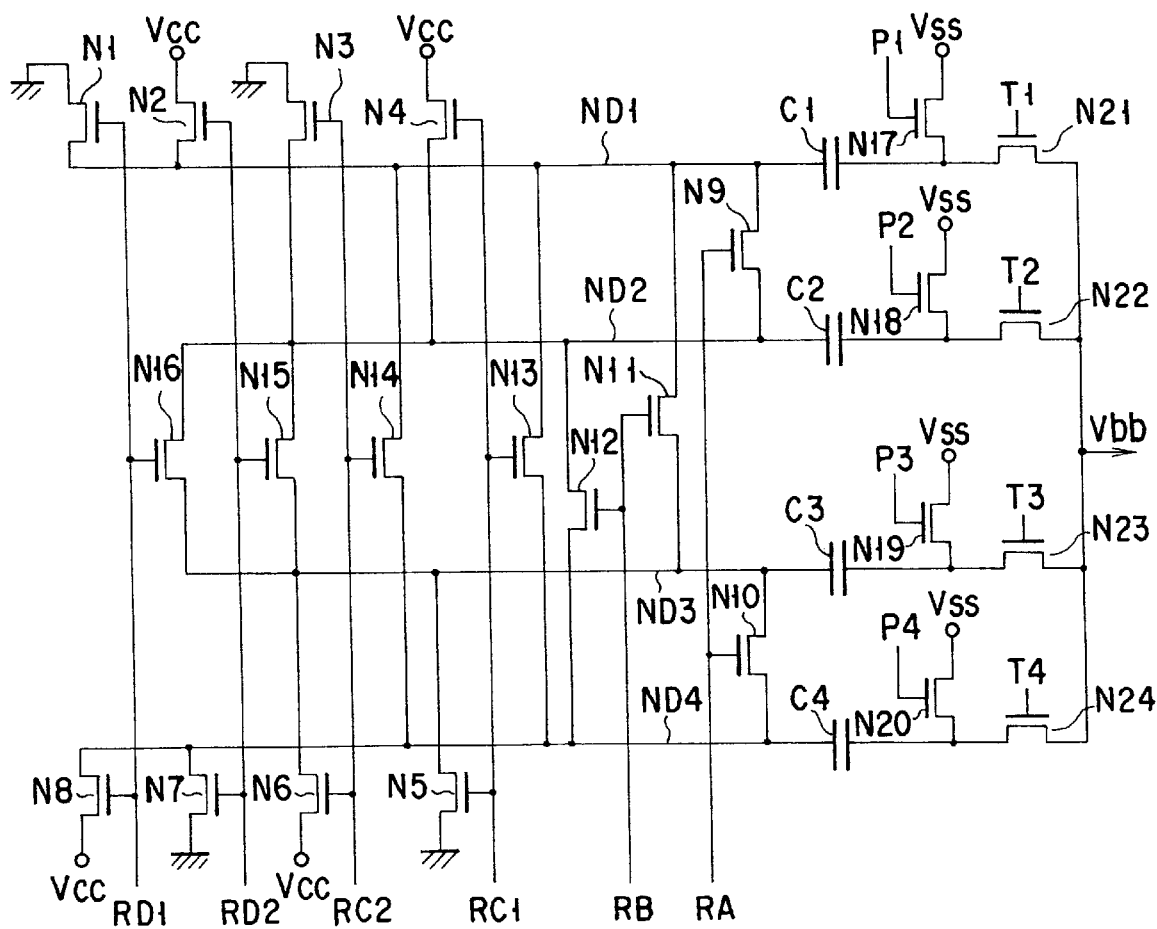
FIG. 12 shows the fifth embodiment of the present invention and is a circuit diagram illustrating an example in which a Vbb pump circuit is constituted by a four phase parallel charge recycle pump circuit.

FIG. 12 shows an example in which a Vbb pump circuit is constituted by a four phase parallel charge recycle pump. The same reference numerals are attached to the same parts as those in FIG. 1, and the only different parts will be explained. In this circuit, the circuit constitution of the left side of the nodes ND1 to ND4 does not differ from that of FIG. 1, and the timing of the signals RA, RB, RC1,RC2, RD1, RD2 is also similar to FIG. 2.

The ground potential Vss is supplied to the supply terminal connected to the transistors N17, N18, N19, N20. The timings of the signals P1, P2, P3, P4 supplied to the gates of the transistors N17, N18, N19, N20 and the signals T1, T2, T3, T4 supplied to the gates of the transistors N21, N22, N23, N24 relative to the electric potentials of the nodes ND1 to ND4 are inversely set relative to the case, for example, of FIG. 1. That is, the signals T1 to T4 go to a high level when the nodes ND1 to ND4 are at least the supply voltage Vcc, respectively. The signals P1 to P4 go to a high level when the nodes ND1 to ND4 are at least the ground voltage Vss, respectively.

With this constitution and the timing setting, electric charge can be drawn from the output terminal, and the substrate voltage vbb can be produced.

(Sixth Embodiment)

Next, the sixth embodiment of the present invention will be explained. The sixth embodiment shows a method for obtaining an efficiency higher than the conventional by combining a conventional two phase serial charge recycle pump circuit and a parallel charge recycle pump circuit in the case where a high boosted voltage as of the first and the second embodiments is not necessary.

Figure 13:
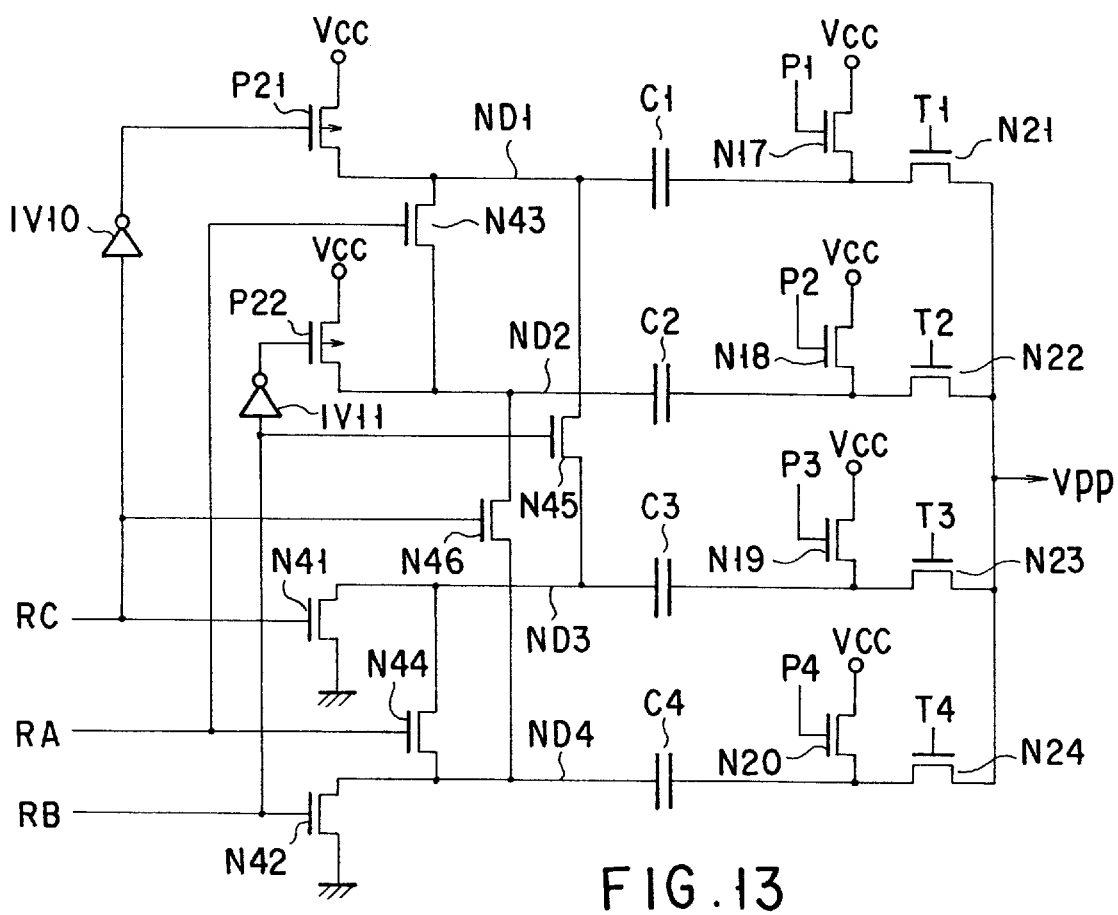
FIG. 13 shows a sixth embodiment of the present invention and is a circuit diagram illustrating a pump circuit in which a serial charge recycle pump circuit and a parallel charge recycle pump circuit are combined.

FIG. 13 shows the sixth embodiment of the present invention. In FIG. 13, the constitution of the right side from the capacitors C1 to C4 is similar to FIG. 1, and the constitution of the left side from the capacitors C1 to C4 differs from FIG. 1. Thus, the same reference numerals are attached to the same parts as those in FIG. 1, and the only different parts will be explained. The node ND1 is connected to a terminal to which the supply voltage Vcc is supplied via a P-channel transistor P21. A signal RC is supplied to the gate of the transistor P21 via an inverter circuit IV10. The node ND2 is connected to a terminal to which the supply voltage Vcc is supplied via a P-channel transistor P22. The signal RB is supplied to the gate of the transistor P22 via an inverter circuit Iv11.

The node ND3 is grounded via an N-channel transistor N41. The signal RC is supplied to the gate of the transistor N41. The node ND4 is grounded via an N-channel transistor N42. The signal RB is supplied to the gate of the transistor N42.

An N-channel transistor N43 is connected between the nodes ND1, ND2. An N-channel transistor N44 is connected between the nodes ND3, ND4. The signal RA is supplied to the gates of the transistors N43, N44. An N-channel transistor N45 is connected between the nodes ND1, ND3, and an N-channel transistor N46 is connected between the nodes ND2, ND4. The signal RB is supplied to the gate of the transistor N45, and the signal RC is supplied to the gate of the transistor N46.

Figure 14:
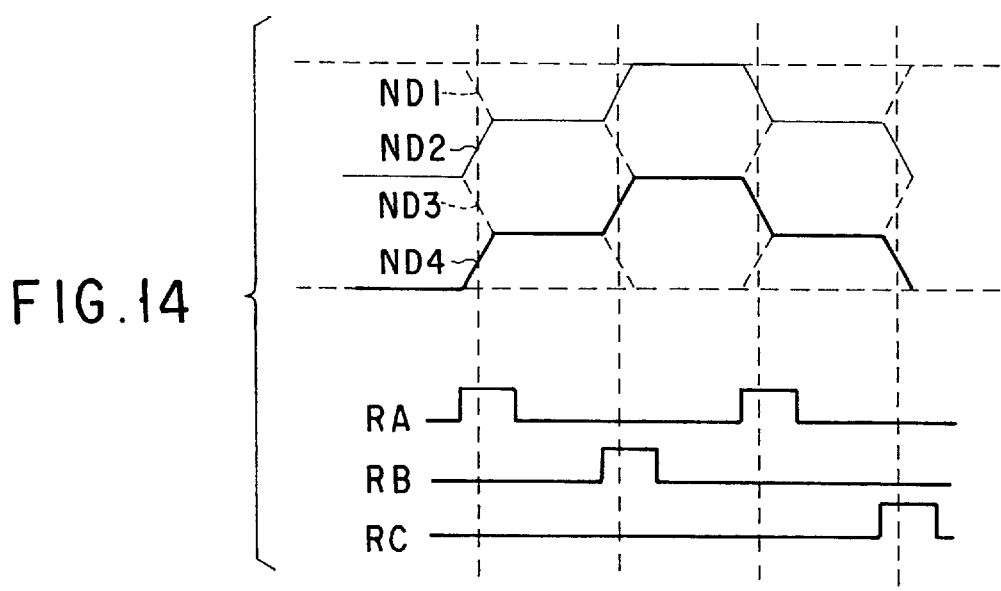
FIG. 14 is waveforms showing operations of FIG. 13.

FIG. 14 is waveforms illustrating operations of FIG. 13. As shown in FIG. 14, a pump operation combining a serial charge recycle and a parallel charge recycle can be implemented by activating the signals RA, RB, RC one by one. Here, giving attention to the node ND1, when the signal RA is activated, the transistor N43 is turned on, and the electric charge of the node ND1 is transferred to the node ND2. After this, when the signal RB is activated, the transistor N45 is turned on, and the electric charge of the node ND1 is transferred to the node ND3. Further, when the signal RA is activated, the transistor N43 is turned on, and electric charge is transferred from the node ND2 to the node ND1. Then, when the signal RC is activated, the transistor P21 is turned on, and the node ND1 is charged to the supply voltage Vcc.

The electric charge of the node ND1 is parallel transferred to the nodes ND2, ND3 via the transistors N43, N45 and is recycled. The electric charge of the node ND2 is parallel transferred to the nodes ND1, ND4 via the transistors N43, N46 and is recycled. However, for example, the electric charge of the node ND1 is not directly transferred to the node ND4 but is transferred via the nodes ND3 and the transistor N44. That is, the electric charge of the node ND1 is transferred to the node ND3 via the transistor N45 and is further transferred to the node ND4 via the transistor N44. Accordingly, the electric charge of the node ND1 is trans-ferred through a serial operation. Although this transferring operation of electric charge is explained paying attention to the node ND1, transferring operations of electric charge regarding other nodes are very similar.

By the operations described above, the electric potentials of the nodes ND1 to ND4 respectively become ½ Vcc, and the boosted voltage Vpp output from the output terminal becomes 1.5 Vcc. In the case of the sixth embodiment, although the boosted voltage Vpp is not so high compared with those of the first, the second, the third, and the fourth embodiments, electric charge can be recycled through a parallel operation. With this, a current efficiency and a power efficiency can be improved compared with a conventional serial charge recycle pump circuit.

With respect to FIG. 4 described above, a characteristic curve F illustrates a power efficiency of the circuit shown in FIG. 13 upon the supply voltage Vcc=1.6 volts. As clear from the drawing, in the range where the boosted voltage Vpp is about 2 volts to 2.2 volts, the circuit shown in FIG. 13 in which the serial charge recycle and the parallel charge recycle are combined has an excellent power efficiency compared with the conventional two phase or four phase serial charge recycle pump circuit and the two phase parallel charge recycle pump circuit.

As described above, by the sixth embodiment in which the serial charge recycle operation and the parallel charge recycle operation are combined, the constitution becomes simple compared with that of the first embodiment, and a high power efficiency can be obtained in the range where the boosted voltage Vpp is relatively low.

The operation shown in the sixth embodiment is not limited to the circuit shown in FIG. 13, and, for example, can be realized by the circuit shown in FIG. 1. In this case, in the circuit shown in FIG. 1, the signals RB, RC2, RD1 shown in FIG. 2 may be maintained at a low level, and control may be implemented by the signals RA, RC1, RD2.

The electric potentials of the signals controlling N-channel MOS transistors, such as the N-channel MOS transistors N1 to N16 and N31 to N38 arranged in the left side from each node ND1 to ND4 shown in FIGS. 1, 8 and 12 are desirably Vcc+Vth which is a threshold voltage Vth higher than the supply voltage Vcc. With this, a decrease of a transfer voltage by the threshold voltage Vth of these transistors can be prevented.

The N-channel MOS transistors, such as the transistors N1 to N16 and N31 to N38 arranged in the left side from each node ND1 to ND4, can be replaced with CMOS transfer gates. In this case, these transfer gates are controlled by, for example, the signals RA, RB, RC1, RC2, RD1, RD2, ACTn, ACTp and the complementary signals thereof /RA, /RB, /RC1, /RC2, /RD1, /RD2, /ACTn, /ACTp. Even with this constitution, a decrease of a transfer voltage by the threshold voltage Vth of transistors can be prevented.

(Seventh Embodiment)

Next, the seventh embodiment of the present invention will be explained. In a charge recycle pump circuit, the more the number of phases is increased, the higher an efficiency can be obtained. However, when the number of phases is increased, accompanied with this, the number of capacitors is increased. In a pump circuit, the greater the capacity of capacitors becomes, the greater the current drive capability can be. With respect to a method for realizing capacitors inside an LSI, there exist a gate capacitor employing a MOS transistor and a capacitor employing metal wiring. When these capacitors are employed so as to realize and use capacitors of a high volume, the chip size of the LSI is increased. When the chip size of the LSI is increased, the problem occurs that not only the manufacture cost but also the cost caused by a decreased yield or the like is increased. Thus, in the present embodiment, capacitors of a pump circuit are provided outside a chip.

Figure 15:
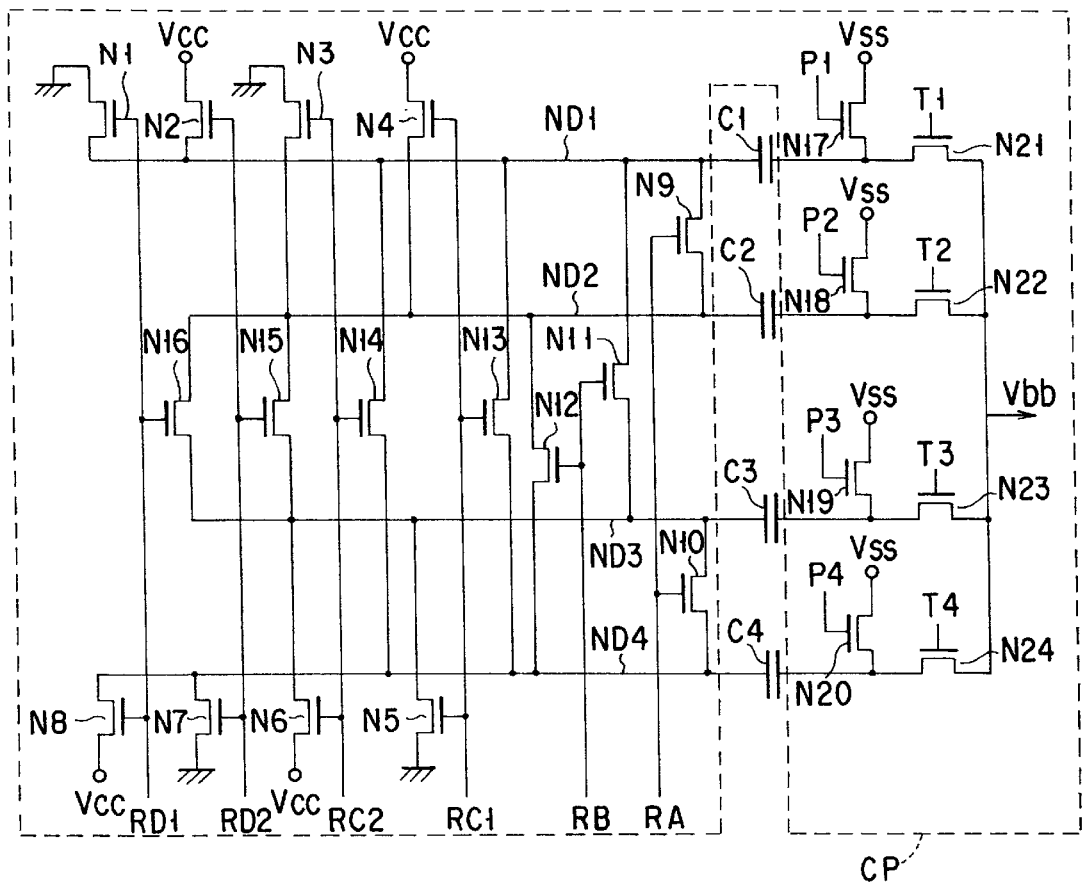
FIG. 15 is a circuit diagram illustrating a seventh embodiment of the present invention.

FIG. 15 shows the seventh embodiment and depicts the case where the present embodiment is applied to the four phase parallel charge recycle pump circuit shown in FIG. 1. That is, the capacitors C1 to C4 are provided outside a chip CP. These capacitors C1 to C4 are composed, for example, of chip parts. For example, in the case where a pump circuit is provided in a semiconductor device of multichip, the capacitors C1 to C4 are arranged on a print substrate on which a plurality of chips are mounted. In the case where a pump circuit is provided in a semiconductor device of single-chip, the capacitors C1 to C4 are connected to leads arranged outside the package in which the chip is accommodated.

The arrangement of the capacitors C1 to C4 is not limited to these examples and is transformable. The kind of capacitor may be appropriately selected in accordance with the working voltage, the operating environment, the volume of the package, and the like of a LSI. Further, the kind of pump circuit is also not limited to the present embodiment.

Since capacitors are connected outside a chip according to the seventh embodiment, even in the case where high volume capacitors are employed, an increase in a chip size can be restricted. Further, a manufacture cost can be reduced, and an improvement in yield can be attempted.

(Eighth Embodiment)

Next, the eighth embodiment of the present invention will be explained. In the present embodiment, the case where a higher voltage is generated using a parallel charge recycle pump circuit will be explained. In an LSI, such as a flash memory, a voltage Vpp (e.g., 20 volts) which is several times higher than the supply voltage Vcc (e.g., 3.0 volts) is needed to be generated inside the LSI. In the case where such high voltage is generated, well known Dickson type pump circuits have been used. The Dickson type pump circuit is constituted in such a manner that a plurality of diodes are serially connected between a supply terminal and an output terminal, one end of capacitors are connected between these diodes, respectively, and signals are alternately supplied to the other end of these capacitors. The output voltage Vpp of this type of pump circuit ideally becomes Vpp=(m+1)Vcc where the number of capacitors is m. In the present embodiment, a plurality of Dickson type pump circuits are serially connected, and a high voltage is generated by recycling charge by these Dickson type pump circuits.

Figure 16:
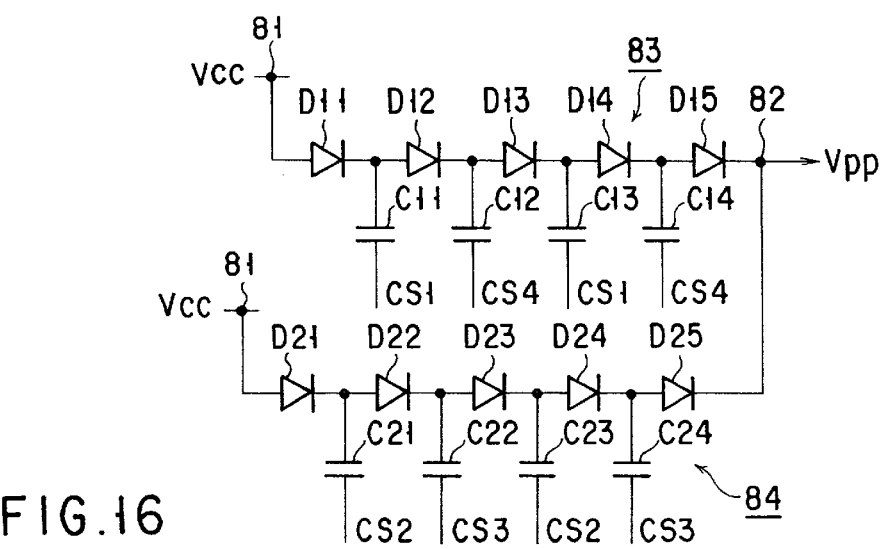
FIG. 16 shows an eighth embodiment of the present invention and is a circuit diagram illustrating a parallel charge pump circuit employing a Dickson type pump circuit.

FIG. 16 shows the eighth embodiment. A first pump circuit 83 and a second pump circuit 84 are connected between a supply terminal 81 to which the supply voltage Vcc is supplied and an output terminal 82. In the first pump circuit 83, diodes D11 to D15 are serially connected between the supply terminal 81 and the output terminal 82. One end of capacitors C11 to C14 is connected to each connecting node of the diodes D11 to D15. A control signal CS1 is supplied to the other end of the capacitors C11, C13, and a control signal CS4 is supplied to the other end of the capacitors C12, C14.

In the second pump circuit 84, diodes D21 to D25 are serially connected between the supply terminal 81 and the output terminal 82. One end of capacitors C21 to C24 is connected to each connecting node of the diodes D21 to D25. A control signal CS2 is supplied to the other end of the capacitors C21, C23, and a control signal CS3 is supplied to the other end of the capacitors C22, C24. The numbers of diodes and capacitors constituting the first and second pump circuits 83, 84 are not limited to the numbers shown in FIG. 16.

Figure 17:
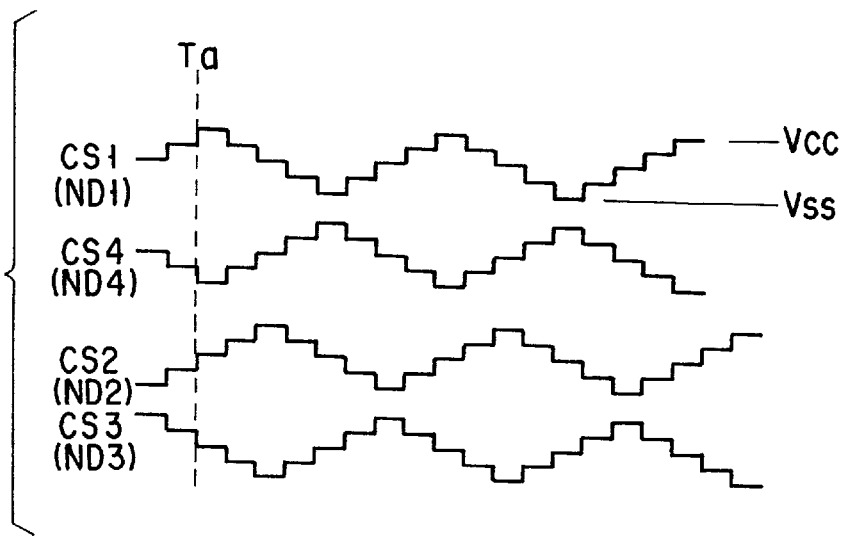
FIG. 17 is waveforms showing one example of control signals of FIG. 16.

FIG. 17 shows the control signals CS1 to CS4. The voltages of the control signals CS1 to CS4 stepwise change in the range between the supply voltage Vcc and the ground voltage Vss. For example, at the timing shown by Ta, the control signal CS1 is the supply voltage Vcc, the control signal CS4 is the ground voltage Vss, and both control signals CS2, CS3 fall into the middle voltage between the supply voltage Vcc and the ground voltage Vss. That is, the control signals CS1, CS4 are inverted phases each other. The phase of the control signal CS2 is shifted 90 degree from the control signal CS1. The phase of the control signal CS3 is shifted 90 degree from the control signal CS4. The first and the second pump circuits 83, 84 are driven by the control signals CS1 to CS4, whereby the supply voltage Vcc is boosted and the boosted voltage Vpp is output from the output terminal 82.

Figure 18:
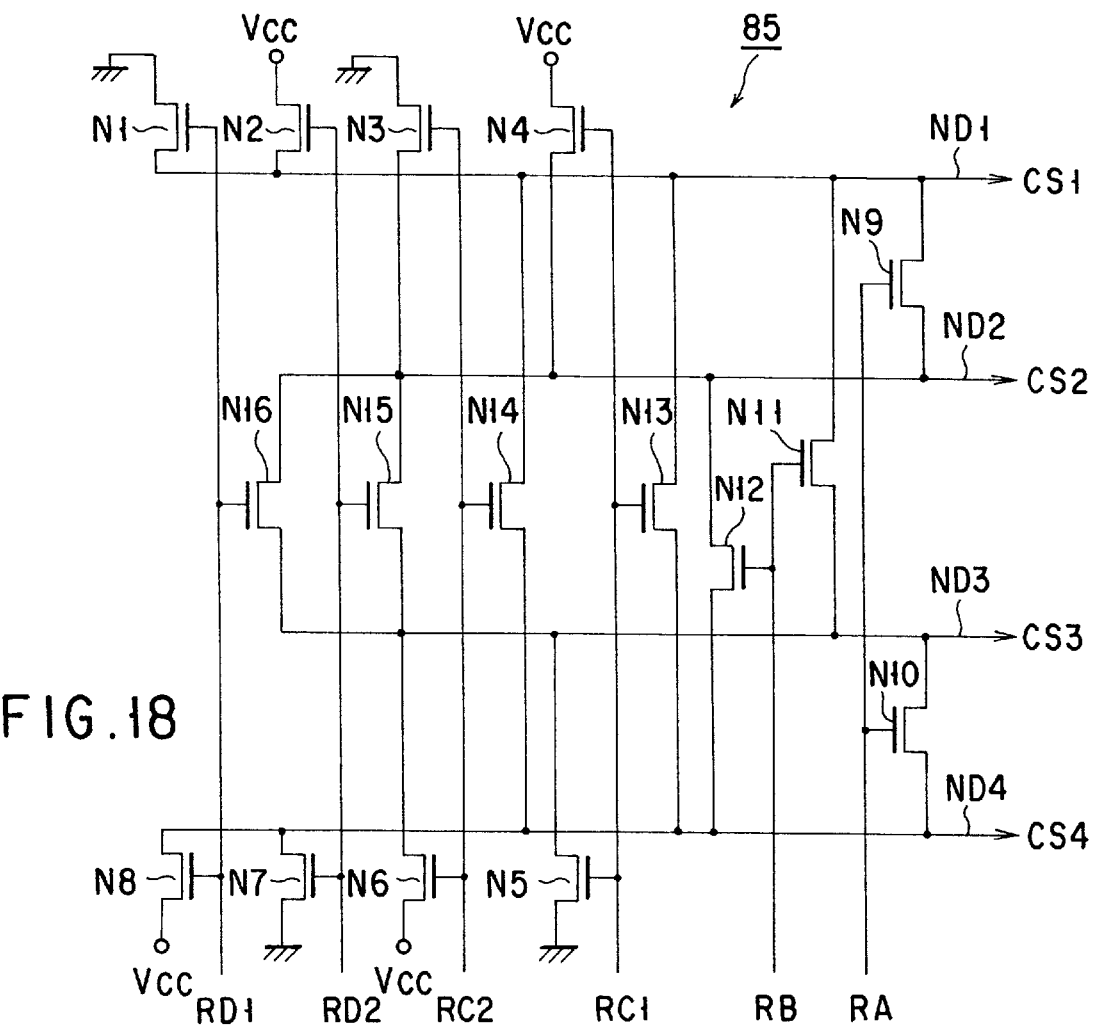
FIG. 18 is a circuit diagram showing a generating circuit of control signals shown in FIG. 17.

FIG. 18 shows a generating circuit 85 generating the control signals CS1 to CS4. This generating circuit 85 is the same as the circuit generating the voltages of the nodes ND1 to ND4 of the four phase parallel charge recycle pump circuit shown in FIG. 1, and the same reference numerals are attached to the same parts as those in FIG. 1. The generating circuit 85 shown in FIG. 18 is operated by the timing shown in FIG. 2, and the control signals CS1 to CS4 are output from the nodes ND1 to ND4, respectively. The first and the second pump circuits 83, 84 are driven by the control signals CS1 to CS4, whereby the boosted voltage Vpp is output from the output node 82. The electric charges of the nodes ND1 to ND4 are mutually recycled.

In the eighth embodiment, the Dickson type first and second pump circuits 83, 84 are parallely connected, and the first and the second pump circuits 83, 84 are driven by the control signals supplied from the generating circuit 85. Thus, the four phase parallel charge recycle pump circuit is realized by employing Dickson type pump circuits. Therefore, a utilization efficiency of electric charge and a current efficiency for obtaining a required boosted voltage can be improved.

(Ninth Embodiment)

Figure 19:
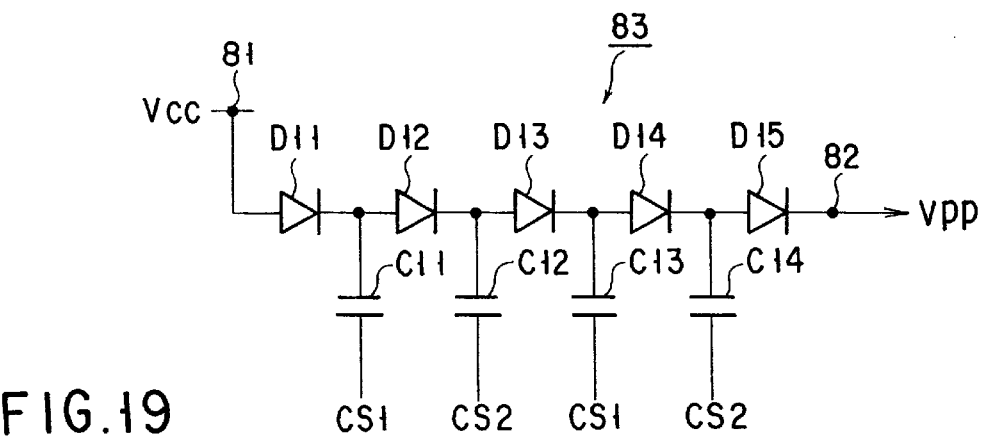
FIG. 19 shows a ninth embodiment of the present invention and is a circuit diagram illustrating a serial charge pump circuit employing a Dickson type pump circuit.

FIG. 19 shows the ninth embodiment of the present invention. This embodiment shows a pump circuit in which charge is serially recycled using a Dickson type pump circuit.

The pump circuit shown in FIG. 19 is similar to the first pump circuit 83 shown in FIG. 16, and the only difference is control signals. That is, the control signal CS1 is supplied to the capacitors C11, C13, and the control signal CS2 is supplied to the capacitors C12, C14.

Figure 20:
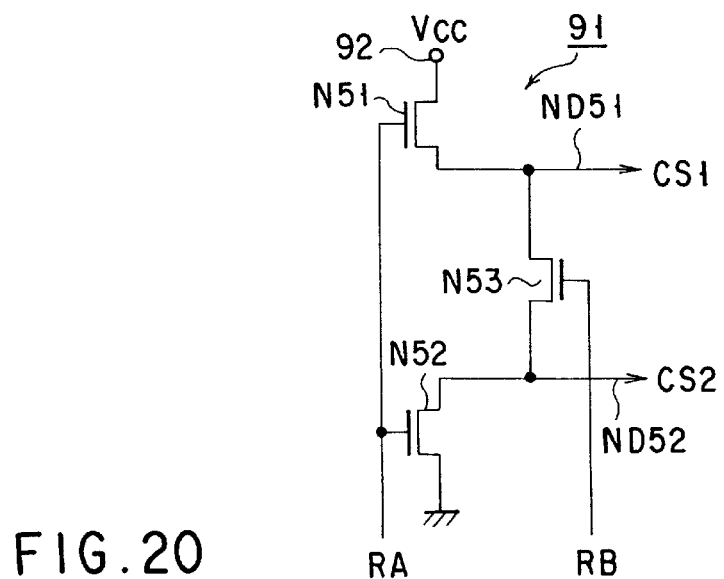
FIG. 20 is a circuit diagram showing a generating circuit of control signals shown in FIG. 19.

FIG. 20 shows a generating circuit 91 generating the control signals CS1, CS2. In this generating circuit 91, an N-channel transistor N51 is connected between a supply terminal 92 and a first output node ND51. An N-channel transistor N52 is connected between a second output node ND52 and the ground. The signal RA is supplied to the gates of the transistors N51, N52. An N-channel transistor N53 is connected between the first and the second output nodes ND51, ND52. The signal RB is supplied to the gate of the transistor N53. The control signal CS1 is output from the first output node ND51, and the control signal CS2 is output from the second output node ND52.

Figure 21:
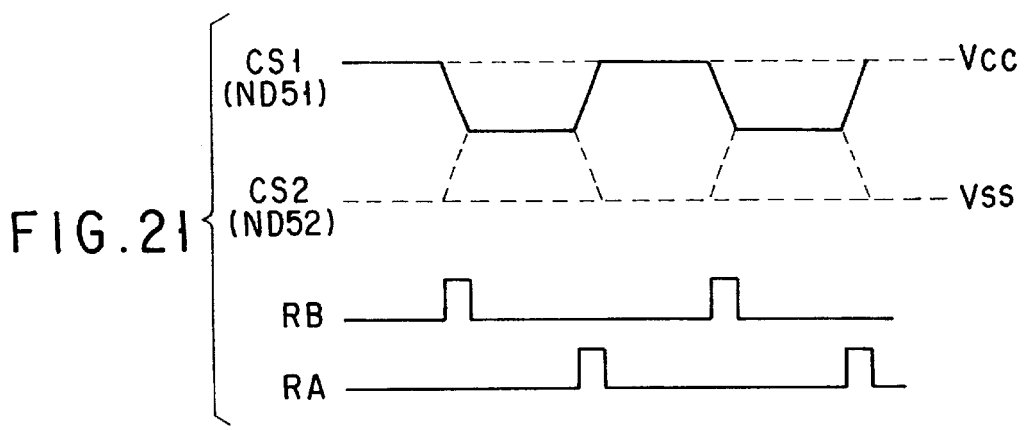
FIG. 21 is waveforms showing operations of FIG. 20.

FIG. 21 shows operations of FIG. 20 and illustrates the relationship between the signals RA, RB and the control signals CS1, CS2. The transistors N51, N52, N53 are controlled in accordance with the signals RA, RB, whereby the control signals CS1, CS2 are generated. The control signal CS1 is a voltage of Vcc to Vcc/2, and the control signal CS2 is a voltage of Vss (0V) to Vcc/2. The pump circuit 83 is driven in accordance with the control signals CS1, CS2, whereby the boosted voltage Vpp is output from the output node 82.

The electric charge of the first output node ND51 is recycled to the second output node ND52 accompanied with the operations of the transistors N51, N52, N53.

According to the ninth embodiment, the pump circuit in which charge is serially recycled using a Dickson type pump circuit can be constituted. Accordingly, a utilization efficiency of electric charge and a current efficiency for obtaining a required boosted voltage can be improved.

(Tenth Embodiment)

Figure 22:
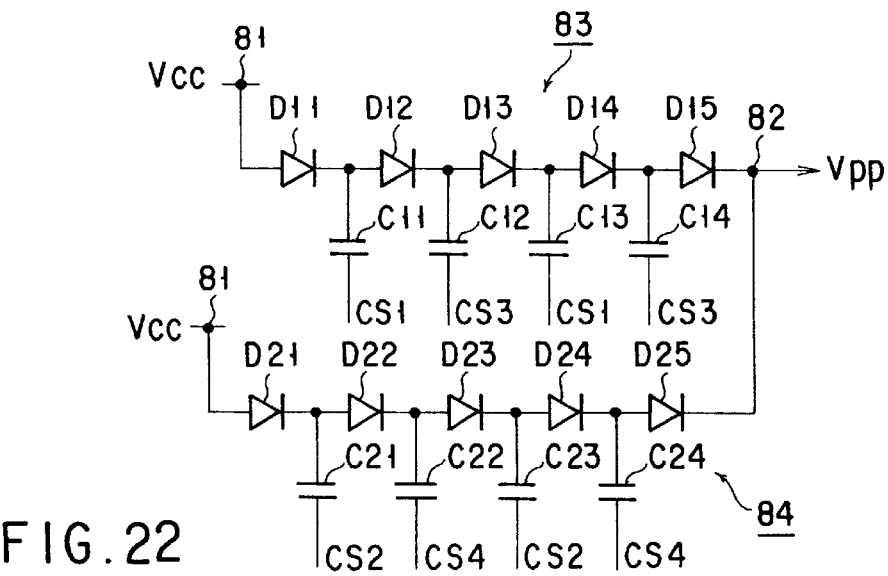
FIG. 22 shows a tenth embodiment of the present invention and is a circuit diagram illustrating a serial charge pump circuit employing a Dickson type pump circuit.

FIG. 22 shows the tenth embodiment of the present invention. This embodiment shows a pump circuit in which charge is serially recycled using a plurality of Dickson type pump circuits.

The pump circuit shown in FIG. 22 is similar to the first and the second pump circuits 83, 84 shown in FIG. 16, and the only difference is control signals. That is, the control signal CS1 is supplied to the capacitors C11, C13, and the control signal CS3 is supplied to the capacitors C12, C14. Further, the control signal CS2 is supplied to the capacitors C21, C23, and the control signal CS4 is supplied to the capacitors C22, C24.

Figure 23:
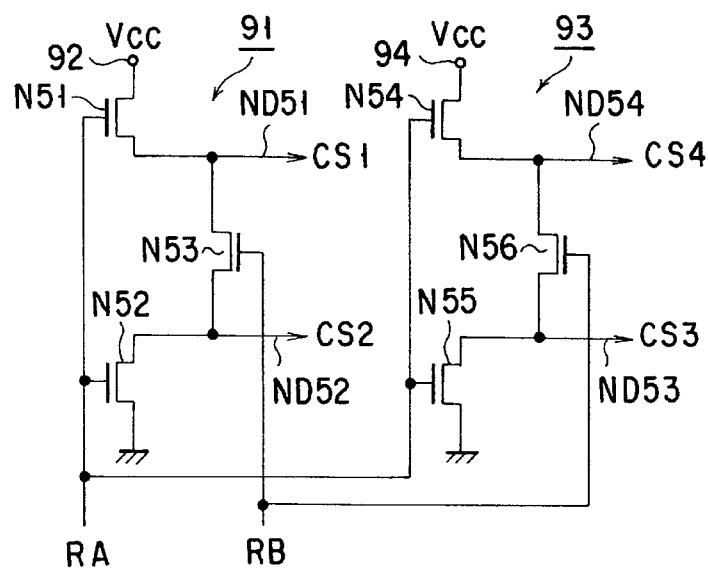
FIG. 23 is a circuit diagram illustrating a generating circuit of control signals shown in FIG. 22.

FIG. 23 shows a generating circuit generating the control signals CS1 to CS4. In this generating circuit, a generating circuit 93 having a similar constitution to the generating circuit 91 shown in FIG. 20 is added thereto. In the generating circuit 93, an N-channel transistor N54 is connected between a supply terminal 94 and a fourth output node ND54, and an N-channel transistor N55 is connected between a third output node ND53 and the ground. The signal RA is supplied to the gates of the transistors N54, N55. An N-channel transistor N56 is connected between the third and the fourth output nodes ND53, ND54. The signal RB is supplied to the gate of the transistor N56. The control signal CS3 is output from the third output node ND53, and the control signal CS4 is output from the fourth output node ND54.

Figure 24:
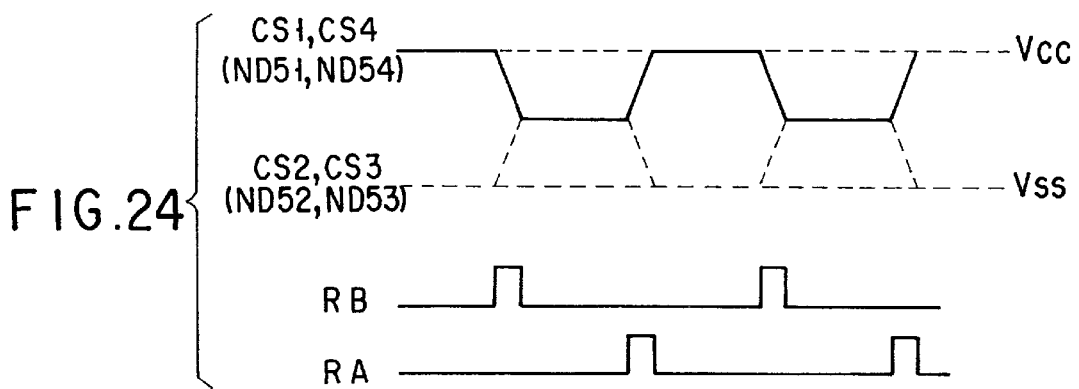
FIG. 24 is waveforms showing operations of FIG. 23.

FIG. 24 shows operations of FIG. 23 and illustrates the relationship between the signals RA, RB and the control signals CS1 to CS4. The transistors N51 to N56 are controlled in accordance with the signals RA, RB, whereby the control signals CS1 to CS4 are generated. The first and the second pump circuits 83, 84 are driven by these CS1 to CS4, whereby the boosted voltage Vpp is output from the output node 82.

The electric charge of the first output node ND51 is recycled to the second output node ND52, and the electric charge of the fourth output node ND54 is recycled to the third output node ND53, accompanied with the operations of the transistors N51 to N56.

According to the tenth embodiment, the pump circuits in which charge is serially recycled using the first and the second pump circuits 83, 84 of the Dickson type can be constituted. Accordingly, a utilization efficiency of electric charge and a current efficiency for obtaining a required boosted voltage can be improved by the present embodiment.

Figure 25:
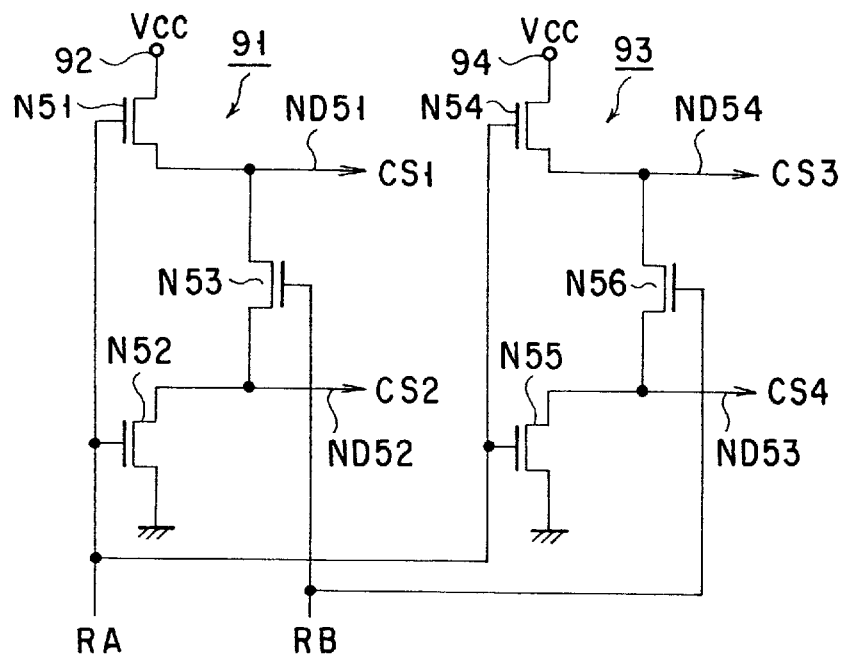
FIG. 25 is a circuit diagram showing another example of the generating circuit shown in FIG. 23.

FIG. 25 shows another example of the generating circuit shown in FIG. 23. In FIG. 25, the same reference numerals are attached to the same parts as those in FIG. 23, and the only different parts will be explained.

In FIG. 25, the signal RB is supplied to the gate of the transistor N56, and the signal RA is supplied to the gates of the transistors N54, N55 of the generating circuit 93. The control signals CS4 is output from the third output node ND53, and the control signal CS3 is output from the fourth output node ND54.

Figure 26:
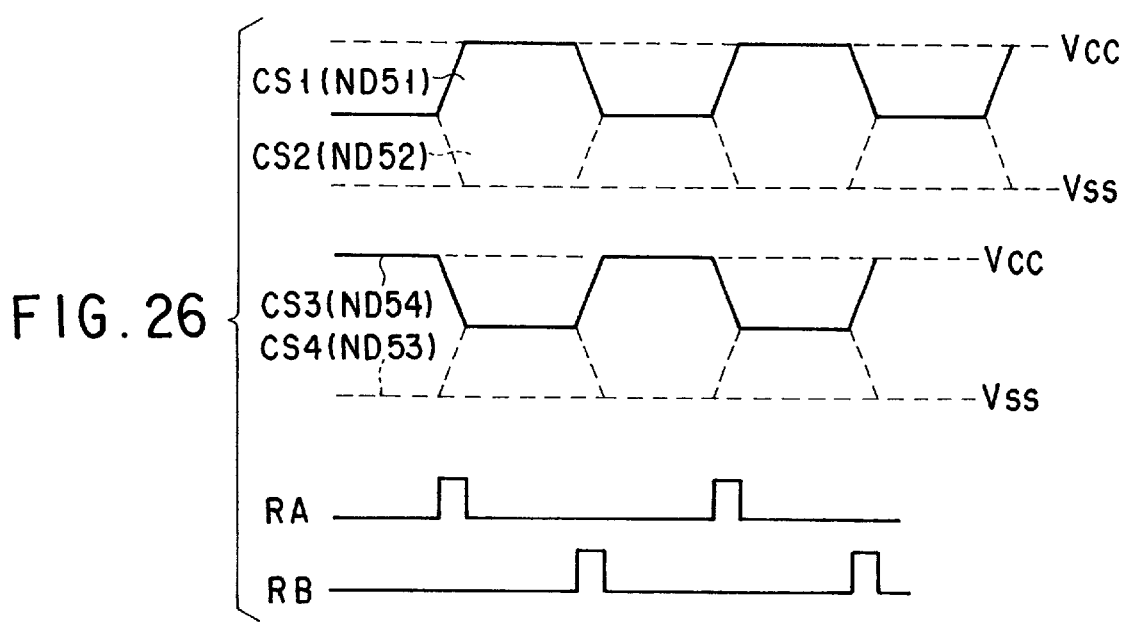
FIG. 26 is waveforms showing operations of FIG. 25.

FIG. 26 shows operations of FIG. 25, and illustrates the relationship between the signals RA, RB and the control signals CS1 to CS4. Thus, the transistors N51 to N56 are controlled in accordance with the signals RA, RB, whereby the control signals CS1 to CS4 are generated.

Even by this constitution, the phases of the control signals supplied to capacitors adjacent thereto can be inverted. Therefore, a required boosted voltage Vpp can be generated in accordance with the control signals CS1 to CS4.

(Eleventh Embodiment)

Figure 27:
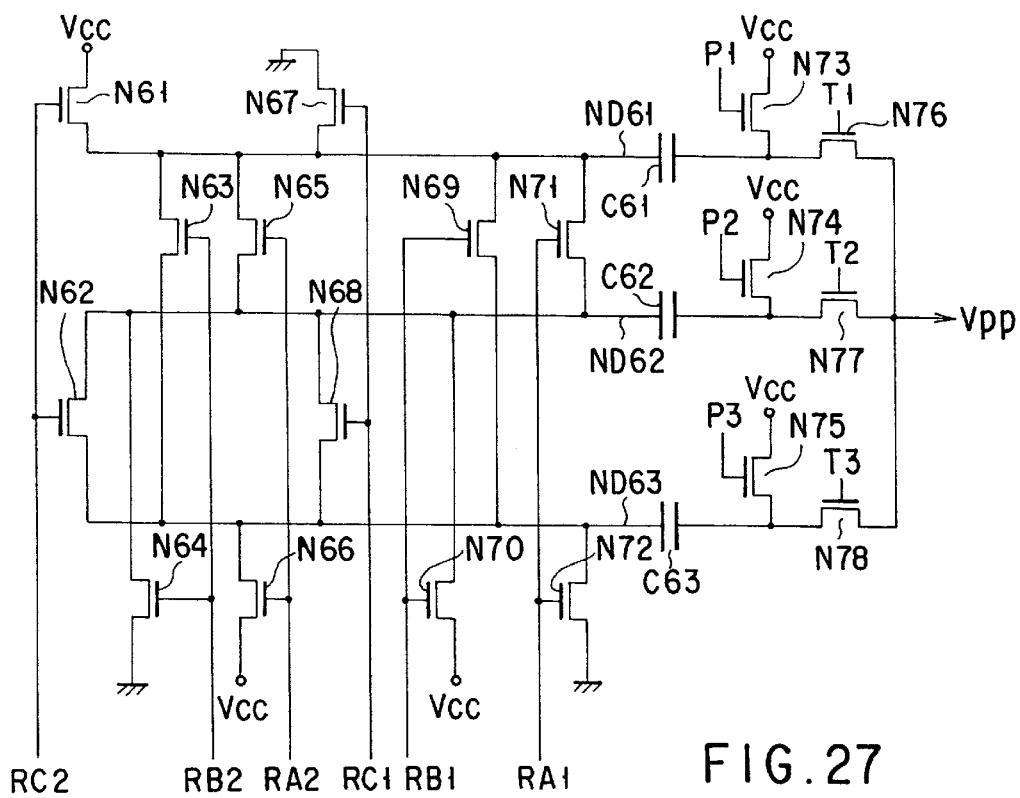
FIG. 27 shows an eleventh embodiment of the present invention and is a circuit diagram illustrating a pump circuit of odd number phases.

FIG. 27 shows the eleventh embodiment of the present invention. Two phase or four phase pump circuits, i.e., pump circuits of even number phases are explained in the embodiments described above. On the other hand, pump circuits of odd number phases will be explained in the present embodiment.

FIG. 27 shows an example of a three phase parallel charge recycle pump circuit.

In FIG. 27, an N-channel transistor N61 for charging a node ND61 is connected between the node ND61 and the terminal to which the supply voltage Vcc is supplied. An N-channel transistor N62 for transferring electric charge between a node ND62 and a node ND63 is connected between the node ND62 and the node ND63. The signal RC2 is supplied to the gates of the transistors N61, N62.

An N-channel transistor N63 for transferring electric charge between the node ND61 and the node ND63 is connected between the node ND61 and the node ND63. An N-channel transistor N64 for discharging electric charge of the node ND62 is connected between the node ND62 and the ground. A signal RB2 is supplied to the gates of the transistors N63, N64.

An N-channel transistor N65 for transferring electric charge between the node ND61 and the node ND62 is connected between the node ND61 and the node ND62. An N-channel transistor N66 for charging the node ND63 is connected between the terminal to which the supply voltage Vcc is supplied and the node ND63. A signal RA2 is supplied to the gates of the transistors N65, N66.

An N-channel transistor N67 for discharging electric charge of the node ND61 is connected between the node ND61 and the ground. An N-channel transistor N68 for transferring electric charge between the node ND62 and the node ND63 is connected between the node ND62 and the node ND63. A signal RC1 is supplied to the gates of the transistors N67, N68.

An N-channel transistor N69 for transferring electric charge between the node ND61 and the node ND63 is connected between the node ND61 and the node ND63. An N-channel transistor N70 for charging the node ND62 is connected between the terminal to which the supply voltage Vcc is supplied and the node ND62. A signal RB1 is supplied to the gates of the transistors N69, N70.

An N-channel transistor N71 for transferring electric charge between the node ND61 and the node ND62 is connected between the node ND61 and the node ND62. An N-channel transistor N72 for discharging electric charge of the node ND63 is connected between the node ND63 and the ground. A signal RA1 is supplied to the gates of the transistors N71, N72.

Paying attention to the node ND61, the charge of the node ND61 is parallel transferable to the nodes ND62, ND63 via the transistors N63, N65, N69, N71. With respect to the other nodes ND62, ND63, the charges of the nodes ND62, ND63 are parallel transferable to the other nodes.

One end of each capacitors C61, C62, C63 is connected to the nodes ND61, ND62, ND63, respectively. N-channel transistors N73, N74, N75 are connected between the other end of the capacitors C61, C62, C63 and the terminal to which the power supply voltage Vcc is supplied, respectively. Signals P1, P2, P3 are supplied to the gates of the transistors N73, N74, N75, respectively.

N-channel transistors N76, N77, N78 are connected between the other end of the capacitors C61, C62, C63 and an output terminal to which a boosted voltage Vpp is output, respectively. Signals T1, T2, T3 are supplied to the gates of the transistors N76, N77, N78, respectively.

Figure 28:
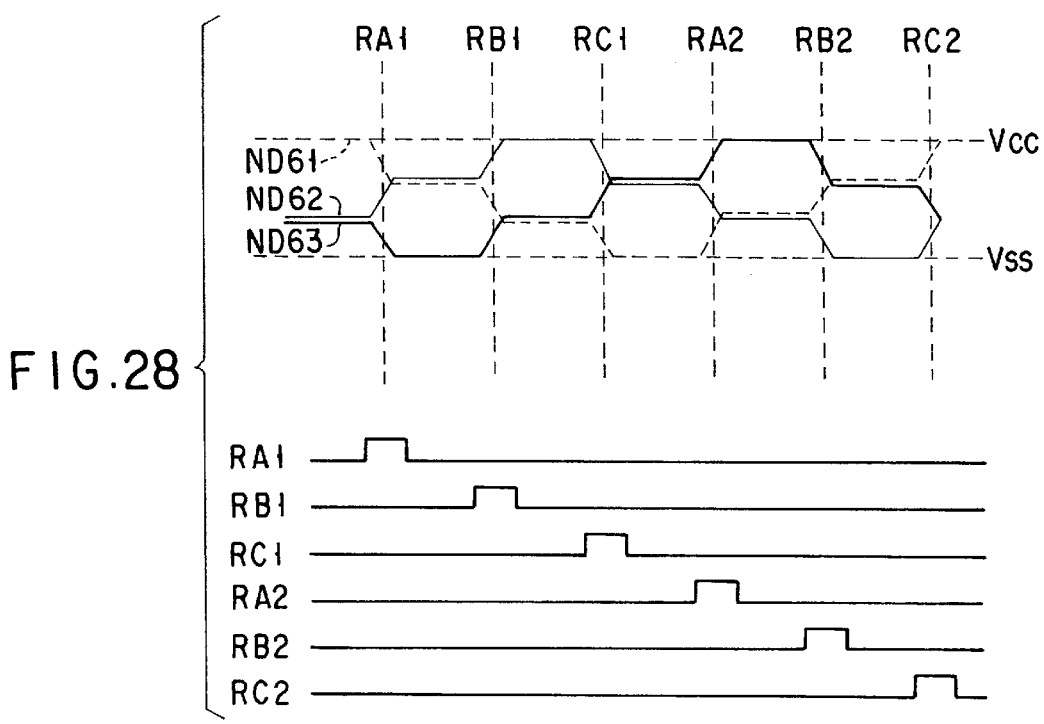
FIG. 28 is waveforms showing operations of FIG. 27.

FIG. 28 shows the relationship between the signals RA1, RB2, RC1, RA1, RB2, RC2 and the voltages of each node ND61, ND62, ND63. The signals RA1, RB2, RC1, RA1, RB2, RC2 are turned on one after another as shown in FIG. 28.

For example, paying attention to the node ND61, when the signal RA1 goes to a high level, the transistors N71, N72 are turned on, and nodes ND61, ND62 are short-circuited. With this, the electric charge of the node ND61 corresponding only to ⅓ Vcc is transferred to the node ND62. Then, when the signal RB1 goes to a high level, the transistor N69 is turned on. Thus, the nodes ND61, ND63 are short-circuited, and the charge of the node ND61 corresponding only to ⅓ Vcc is transferred to the node ND63. When the signal RC1 goes to a high level, the transistor N67 is turned on, and the charge of the node ND61 is discharged.

After this, when the signal RA2 goes to a high level, the transistor N65 is turned on. With this the nodes ND61, ND2 are short-circuited, and the charge of the node ND62 corresponding only to ⅓ Vcc is transferred to the node ND61. Then, when the signal RB2 goes to a high level, the transistor N63 is turned on, and the node ND61 is short-circuited with the node ND63. With this, the charge of the node ND63 corresponding only to ⅓ Vcc is transferred to the node ND61. Further, when the signal RC2 goes to a high level, the transistor N61 is turned on, and the charge corresponding only to ⅓ Vcc is supplied from the power supply to the node ND61. With this, the electric potential of the node ND61 fully swings between the supply voltage Vcc and the ground voltage Vss. Through a similar operation, each electric potential of the nodes ND62, ND63 fully swings between the supply voltage Vcc and the ground voltage Vss.

The signals P1 to P3 go to a high level when the nodes ND61 to ND63 are at least the ground voltage Vss, respectively. With this, the other end of each capacitor C61, C62, C63 is charged to the supply voltage Vcc via the transistors N73, N74, N75, respectively. The signals T1 to T3 go to a high level when the nodes ND61 to ND63 are at least the supply voltage Vcc, respectively. With this, the voltage boosted by coupling at the other end of each capacitors C61, C62, C63 is output via the transistors N76, N77, N78. Therefore, the boosted voltage Vpp of the maximum 2 Vcc is output from the output terminal.

According to the eleventh embodiment described above, the electric charge of each node corresponding to ⅓ Vcc is each recycled to other nodes, whereby a three phase parallel charge recycle pump circuit can be constituted. Each electric potential of the nodes ND61 to ND63 fully swings between the supply voltage vcc and the ground voltage Vss. Further, since the amount of the current corresponding to the electric potential of only ⅓ Vcc is needed to be supplied from the power supply to each node, ⅔ of the electric charge charged in each node can be utilized. Therefore, a utilization efficiency of electric charge and a current efficiency for obtaining a required boosted voltage can be improved.

Although the case of the three phase is exemplified in the present embodiment, odd number phases of five phases or more can be realized.

Further, in each embodiment described above, electric charge is charged in a plurality of capacitors, and the electric charge of these capacitors is transferred to other capacitors via transistors, thereby recycling electric charge. However, the circuit element for storing electric energy such as electric charge is not limited to a capacitor, and other circuit elements can be employed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A pump circuit comprising:
    at least three capacitors each having a first node and a second node;
    a plurality of first transistors connected between the first nodes of respective said capacitors and a first power supply, said first transistors charging said first nodes, respectively;
    a plurality of second transistors connected between the second nodes of respective said capacitors and the first power supply, said second transistors charging said second nodes, respectively;
    a plurality of third transistors connected between the second nodes of respective said capacitors and an output terminal, said third transistors outputting the electric charge of respective said capacitors to the output terminal; and
    a plurality of fourth transistors connected between the first nodes of respective said capacitors, said forth transistors sharing control signals with said first transistors corresponding thereto.

2. The pump circuit according to claim 1, wherein said capacitors are arranged outside a semiconductor chip.

3. A pump circuit comprising:
    at least three capacitors each having a first node and a second node;
    a plurality of first transistors connected between the first nodes of respective said capacitors and a first power supply, said first transistors charging said first nodes, respectively;
    a plurality of second transistors connected between the second nodes of respective said capacitors and the first power supply, said second transistors charging said second nodes, respectively;
    a plurality of third transistors connected between the second nodes of respective said capacitors and an output terminal, said third transistors outputting the electric charge of respective said capacitors to the output terminal;
    a plurality of fourth transistors each connected between the first node of one of respective said capacitors and the first node of one of said capacitors which is adjacent to said capacitor, each said forth transistor transferring electric charge between the first nodes of respective said capacitors;

at least one fifth transistor connected between the first node of one of respective said capacitors and the first node of at least another one of said capacitors which is excluded from the capacitor which is adjacent to said capacitor, said fifth transistor transferring electric charge between the first nodes of respective said capacitors;

a detection circuit for detecting a boosted voltage output from the output terminal; and a control circuit connected to the detection circuit, said control circuit for selectively turning on the fourth transistors so as to serially transfer electric charge between the first nodes of the capacitors adjacent to each other when the voltage detected by the detection circuit is lower than a reference voltage and selectively turning on the first transistors, the fourth transistors, and the fifth transistors so as to parallel transfer electric charge of the first nodes of the capacitors to the first nodes of the capacitors adjacent to each other and the first nodes of the other capacitors when the voltage detected by the detection circuit is higher than the reference voltage.

4. A pump circuit comprising:

at least three capacitors each having a first node and a second node;

a plurality of first transistors connected between the first nodes of respective said capacitors and a first power supply, said first transistors charging said first nodes, respectively;

a plurality of second transistors connected between the second nodes of respective said capacitors and the first power supply, said second transistors charging said second nodes, respectively;

a plurality of third transistors connected between the second nodes of respective said capacitors and an output terminal, said third transistors outputting the electric charge of respective said capacitors to the output terminal;

a plurality of fourth transistors each connected between the first node of one of respective said capacitors and the first node of one of said capacitors which is adjacent to said capacitor, each said forth transistor transferring electric charge between the first nodes of respective said capacitors;

at least one fifth transistor connected between the first node of one of respective said capacitors and the first node of at least another one of said capacitors which is excluded from the capacitor which is adjacent to said capacitor, said fifth transistor transferring electric charge between the first nodes of respective said capacitors;

a detection circuit for detecting a boosted voltage output from the output terminal; and a control circuit connected to the detection circuit, said control circuit selectively turning on the fourth transistors so as to serially transfer electric charge between the first nodes adjacent to each other when the voltage detected by the detection circuit is lower than a first reference voltage, selectively turning on the fourth transistors so as to serially transfer electric charge of the first nodes by the number of phases smaller than the number of capacitors when the voltage detected by the detection circuit is higher than the first reference voltage and is lower than a second reference voltage, and selectively turning on the first transistors, the fourth transistors, and the fifth transistors so as to parallel transfer electric charge of the first nodes to the first nodes adjacent to each other and the other first nodes when the voltage detected by the detection circuit is higher than the second reference voltage.

5. The pump circuit according to claim 4, further comprising:

a plurality of sixth transistors connected between the first nodes of respective said capacitors and the first power supply so as to charge the first nodes;

seventh transistors connected between the first nodes of respective said capacitors and a second power supply so as to discharge the first nodes; and a control circuit connected to the sixth and the seventh transistors so as to alternately turn on the sixth and the seventh transistors at the time of power-on.

6. A pump circuit comprising:

at least three capacitors each having a first node and a second node;

a plurality of first transistors connected between the first nodes of respective said capacitors and a first power supply, said first transistors charging said first nodes, respectively;

a plurality of second transistors connected between the second nodes of respective said capacitors and a second power supply lower than the first power supply, said second transistors discharging said second nodes, respectively;

third transistors connected between the second nodes of respective said capacitors and an output terminal, respectively, said third transistors drawing electric charge from the output terminal;

a plurality of fourth transistors connected between the first node of one of respective said capacitors and another first node of the capacitors, said forth transistor transferring electric charge between the first nodes; and a control circuit connected to the first transistors and the forth transistors, said control circuit selectively turning on the first transistors and the forth transistors so as to parallel transfer electric charge of the first nodes to the other first nodes.

7. The pump circuit according to claim 6, wherein said output terminal outputs a negative voltage.

8. A pump circuit comprising:

at least four capacitors, said capacitors having first and second nodes;

first transistors for charging the first nodes of at least two said capacitors, respectively;

second transistors for discharging the first nodes of at least two of said capacitors, respectively;

third transistors for charging the second node of each said capacitor, respectively;

a plurality of fourth transistors connected between the second nodes of respective said capacitors and an output terminal, said fourth transistors outputting the electric charge of the second nodes to the output terminal, respectively;

a plurality of fifth transistors connected between the first node of one of respective said capacitors and another first node of the capacitors, said fifth transistors transferring electric charge between the first nodes; and a control circuit for selectively turning on the first and the second transistors and the fourth transistors, said control circuit parallel transferring electric charge of one of the first nodes to one other first node adjacent thereto so as to serially transfer electric charge of said first node to another distant first node.

9. A pump circuit comprising:

at least three energy storage devices, each energy storage device having first and second nodes;

first supply parts for supplying energy to the first nodes of respective said energy storage devices;

second supply parts for supplying energy to the second nodes of respective said energy storage devices;

removing parts for removing energy from the first nodes of respective said energy storage devices;

third supply parts connected to the second nodes of respective said energy storage devices and an output terminal, said third supply part each supplying the energy of the second nodes to the output terminal;

a plurality of fourth supply parts provided between one of the first nodes among respective said energy storage devices and another first node of respective said energy storage devices, said fourth supply part supplying energy from one of the first nodes to another first node of respective said energy storage devices; and a control part for selectively controlling the first supply parts and the fourth supply parts, said control part parallel transferring the energy of the first nodes to the other first nodes.

10. A pump circuit comprising:

a first capacitor having first and second nodes;

a second capacitor having third and fourth nodes;

a third capacitor having fifth and sixth nodes;

a first transistor connected between said second node of the first capacitor and a first supply terminal to which a first voltage is supplied, said first transistor charging said second node;

a second transistor connected between said fourth node of the second capacitor and said first supply terminal, said second transistor charging said fourth node;

a third transistor connected between said sixth node of the third capacitor and said first supply terminal, said third transistor charging said sixth node;

a fourth transistor connected between said second node of the first capacitor and an output terminal, said fourth transistor transferring said second node to the output terminal;

a fifth transistor connected between said fourth node of the second capacitor and said output terminal, said fifth transistor transferring said forth node to the output terminal;

a sixth transistor connected between said sixth node of the third capacitor and said output terminal, said sixth transistor transferring said sixth node to the output terminal;

a seventh transistor connected between said first node and said first supply terminal, said seventh transistor charging said first node to said first voltage according to a first signal;

an eighth transistor connected between said third node and said fifth node, said eighth transistor transferring electric charge between said third node and said fifth node according to said first signal;

a ninth transistor connected between said first node and said fifth node, said ninth transistor transferring electric charge between said first node and said fifth node according to a second signal;

a tenth transistor connected between said third node and a second supply terminal to which a second voltage lower than said first voltage is supplied, said tenth transistor discharging said third node to said second voltage according to said second signal;

an eleventh transistor connected between said first node and said third node, said eleventh transistor transferring electric charge between said first node and said third node according to a third signal;

a twelfth transistor connected between said fifth node and said first supply terminal, said twelfth transistor charging said fifth node to said first voltage according to said third signal;

a thirteenth transistor connected between said first node and said second supply terminal, said thirteenth transistor discharging said first node to said second voltage according to a fourth signal;

a fourteenth transistor connected between said third node and said fifth node, said fourteenth transistor transferring electric charge between said third node and said fifth node according to said fourth signal;

a fifteenth transistor connected between said first node and said fifth node, said fifteenth transistor transferring electric charge between said first node and the fifth node according to a fifth signal;

a sixteenth transistor connected between said third node and said first supply terminal, said sixteenth transistor charging said third node to said first voltage according to said fifth signal;

a seventeenth transistor connected between said first node and said third node, said seventeenth transistor transferring electric charge between said first node and the third node according to a sixth signal; and an eighteenth transistor connected between said fifth node and said second supply terminal, said eighteenth transistor discharging said fifth node to said second voltage according to said sixth signal.

11. A pump circuit comprising:

a first capacitor having first and second nodes;

a second capacitor having third and fourth nodes;

a third capacitor having fifth and sixth nodes;

a fourth capacitor having seventh and eighth nodes;

a first transistor connected between said second node of the first capacitor and a first supply terminal to which a first voltage is supplied, said first transistor charging said second node;

a second transistor connected between said fourth node of the second capacitor and said first supply terminal, said second transistor charging said fourth node;

a third transistor connected between said sixth node of the third capacitor and said first supply terminal, said third transistor charging said sixth node;

a fourth transistor connected between said eighth node of the fourth capacitor and said first supply terminal, said fourth transistor charging said eighth node;

a fifth transistor connected between said second node of the first capacitor and an output terminal, said fifth transistor transferring said second node to the output terminal;

a sixth transistor connected between said fourth node of the second capacitor and said output terminal, said sixth transistor transferring said fourth node to the output terminal;

a seventh transistor connected between said sixth node of said third capacitor and said output terminal, said seventh transistor transferring said sixth node to the output terminal;

an eighth transistor connected between said eighth node of said fourth capacitor and said output terminal, said eighth transistor transferring said eighth node to the output terminal;

a ninth transistor connected between said first node and said a second supply terminal to which a second voltage lower than said first voltage is supplied, said ninth transistor charging said first node to said first voltage according to a first signal;

a tenth transistor connected between said third node and the fifth node, said tenth transistor transferring electric charge between said third node and said fifth node according to said first signal;

an eleventh transistor connected between said seventh node and said first supply terminal, said eleventh transistor charging said seventh node to said first voltage according to said first signal;

a twelfth transistor connected between said first node and said first supply terminal, said twelfth transistor charging said first node to said first voltage according to a second signal;

a thirteenth transistor connected between said third node and said fifth node, said thirteenth transistor transferring electric charge between said third node and said fifth node according to said second signal;

a fourteenth transistor connected between said fourth node and said second supply terminal, said fourteenth transistor discharging said fourth node to said second voltage according to said second signal;

a fifteenth transistor connected between said third node and said second supply terminal, said fifteenth transistor discharging said third node to said second voltage according to a third signal;

a sixteenth transistor connected between said first node and said seventh node, said sixteenth transistor transferring electric charge between said first node and the seventh node according to said third signal;

a seventeenth transistor connected between said fifth node and said first supply terminal, said seventeenth transistor charging said fifth node to said first voltage according to said third signal;

an eighteenth transistor connected between said third node and said first supply terminal, said eighteenth transistor charging said third node to said first voltage according to a fourth signal;

a nineteenth transistor connected between said first node and said seventh node, said nineteenth transistor transferring electric charge between said first node and the seventh node according to said fourth signal;

a twentieth transistor connected between said fifth node and said second supply terminal, said twentieth transistor discharging said fifth node to said second voltage according to said fourth signal;

a twenty-first transistor connected between said first node and said fifth node, said twenty-first transistor transferring electric charge between said first node and the fifth node according to a fifth signal;

a twenty-second transistor connected between said third node and said seventh node, said twenty-second transistor transferring electric charge between said third node and the seventh node according to said fifth signal;

a twenty-third transistor connected between said first node and said third node, said twenty-third transistor transferring electric charge between said first node and the third node according to a sixth signal; and a twenty-fourth transistor connected between said fifth node and said seventh node, said twenty-fourth transistor transferring electric charge between said fifth node and the seventh node according to said sixth signal.

\* \* \* \* \*